(12) United States Patent
Hong et al.

(10) Patent No.: US 11,296,824 B2
(45) Date of Patent: Apr. 5, 2022

(54) DEVICE AND METHOD FOR SUPPORTING DIFFERENT SERVICES IN WIRELESS COMMUNICATION SYSTEM

(71) Applicant: Samsung Electronics Co., Ltd, Suwon-si (KR)

(72) Inventors: Sungnam Hong, Suwon-si (KR); Chanhong Kim, Suwon-si (KR); Yeohun Yun, Hwaseong-si (KR); Jongbu Lim, Seoul (KR); Taeyoung Kim, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 106 days.

(21) Appl. No.: 16/609,167

(22) PCT Filed: Apr. 4, 2018

(86) PCT No.: PCT/KR2018/003983
§ 371 (c)(1),
(2) Date: Oct. 28, 2019

(87) PCT Pub. No.: WO2018/199496
PCT Pub. Date: Nov. 1, 2018

(65) Prior Publication Data
US 2020/0228240 A1 Jul. 16, 2020

(30) Foreign Application Priority Data
Apr. 28, 2017 (KR) .................. 10-2017-0055675

(51) Int. Cl.
*H04L 1/00* (2006.01)
*H04L 5/00* (2006.01)
(Continued)

(52) U.S. Cl.
CPC .......... *H04L 1/0068* (2013.01); *H04L 5/0051* (2013.01); *H04W 72/0453* (2013.01); *H04W 72/1263* (2013.01)

(58) Field of Classification Search
CPC ... H04L 1/0068; H04L 5/0051; H04L 5/0096; H04W 72/0453; H04W 72/1263
See application file for complete search history.

(56) References Cited

U.S. PATENT DOCUMENTS

| 9,420,564 B2 | 8/2016 | Charbit et al. |
| 10,771,218 B2 | 9/2020 | Farajidana et al. |

(Continued)

FOREIGN PATENT DOCUMENTS

| KR | 10-2011-0089311 A | 8/2011 |
| KR | 10-2012-0090083 A | 8/2012 |

OTHER PUBLICATIONS

ZTE et al., "Considerations on using a puncturing indicator in dynamic DL resource sharing between URLLC & eMBB", 3GPP TSG RAN WG1 Meeting #88b, Apr. 3-7, 2017, R1-1704780, 5 pages.

(Continued)

*Primary Examiner* — Will W Lin

(57) ABSTRACT

The present disclosure relates to $5^{th}$ generation (5G) or pre-5G communication system for supporting a higher data transmission rate beyond a $4^{th}$ generation (4G) communication system such as long term evolution (LTE). An operation method of a base station in a wireless communication system comprises the steps of: reallocating a resource, which has been allocated to a first service, to a second service in order to provide the second service; transmitting control information related to at least one reference signal punctured for reallocation of the resource; and transmitting the at least one punctured reference signal via a resource (Continued)

different from the resource having been allocated to the second service.

17 Claims, 28 Drawing Sheets

(51) Int. Cl.
*H04W 72/04* (2009.01)
*H04W 72/12* (2009.01)

(56) References Cited

U.S. PATENT DOCUMENTS

| | | | |
|---|---|---|---|
| 2011/0252130 A1 | 10/2011 | Bhattad et al. | |
| 2011/0252139 A1 | 10/2011 | Bhattad et al. | |
| 2015/0256308 A1 | 9/2015 | Ma et al. | |
| 2015/0280871 A1 | 10/2015 | Xu et al. | |
| 2018/0145818 A1* | 5/2018 | Choi | H04L 5/0051 |
| 2019/0173554 A1* | 6/2019 | Kwak | H04B 7/0626 |
| 2019/0349960 A1* | 11/2019 | Li | H04W 72/1242 |
| 2020/0022117 A1* | 1/2020 | Dong | H04W 72/0453 |

OTHER PUBLICATIONS

Apple Inc., "eMBB and URLLC Multiplexing for NR", 3GPP TSG-RAN WG1 #88bis, Mar. 3-7, 2017, R1-1705051, 4 pages.
Wilus Inc., "Impact on eMBB DMRS Puncturing by URLLC Burst", 3GPP TSG RAN WG1 Meeting #88bis, Apr. 3-7, 2017, R1-1705851, 6 pages.
Sequans Communications, "Puncturing indication and supplementary transmission for preemption-based multiplexing of URLLC and eMBB in DL", 3GPP TSG RAN WG1 Meeting #88bis, Apr. 3-7, 2017, R1-1705882, 6 pages.
International Search Report dated Aug. 21, 2018 in connection with International Patent Application No. PCT/KR2018/003983, 2 pages.
Written Opinion of the International Searching Authority dated Aug. 21, 2018 in connection with International Patent Application No. PCT/KR2018/003983, 6 pages.
ASUSTek, "UL power conlrol in multi-beam based approaches", 3GPP TSG RAN WG1 Meeting #88bis, Apr. 3-7, 2017, R1-1705822, 3 pages.
Notice of Preliminary Rejection dated Jan. 28, 2021 in connection with Korean Patent Application No. 10-2017-0055675, 8 pages.
Notice of Patent Grant dated Jul. 22, 2021 in connection with Korean Patent Application No. 10-2017-0055675, 4 pages.

* cited by examiner

DEVICE AND METHOD FOR SUPPORTING DIFFERENT SERVICES IN WIRELESS COMMUNICATION SYSTEM

CROSS-REFERENCE TO RELATED APPLICATIONS

This application is a 371 of International Application No. PCT/KR2018/003983 filed on Apr. 4, 2018, which claims priority to Korean Patent Application No. 10-2017-0055675 filed on Apr. 28, 2017, the disclosures of which are herein incorporated by reference in their entirety.

BACKGROUND

1. Field

The disclosure relates generally to a wireless communication system, and more particularly, to an apparatus and a method for supporting different services in a wireless communication system.

2. Description of Related Art

To meet the demand for wireless data traffic having increased since deployment of $4^{th}$ generation (4G) communication systems, efforts have been made to develop an improved $5^{th}$ generation (5G) or pre-5G communication system. Therefore, the 5G or pre-5G communication system is also called a 'Beyond 4G Network' or a 'Post Long Term Evolution (LTE) System'.

The 5G communication system is considered to be implemented in higher frequency (mmWave) bands, e.g., 60 GHz bands, so as to accomplish higher data rates. To decrease propagation loss of the radio waves and increase the transmission distance, the beamforming, massive multiple-input multiple-output (MIMO), Full Dimensional MIMO (FD-MIMO), array antenna, an analog beam forming, large scale antenna techniques are discussed in 5G communication systems.

In addition, in 5G communication systems, development for system network improvement is under way based on advanced small cells, cloud Radio Access Networks (RANs), ultra-dense networks, device-to-device (D2D) communication, wireless backhaul, moving network, cooperative communication, Coordinated Multi-Points (CoMP), reception-end interference cancellation and the like.

In the 5G system, Hybrid frequency shift keying (FSK) and quadrature amplitude modulation (FOAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

On the basis of the development of various types of technologies as described above, the 5G systems are considering support for more diverse services in comparison with the legacy 4G systems. Examples of the most representative services are Enhanced Mobile Broadband (eMBB) aiming at a mobile ultra-broadband service, Ultra-Reliable and Low-Latency Communication (URLLC) aiming at an ultra-reliable/low-latency service, Massive Machine-Type Communication (mMTC) aiming at a massive device-to-device communication service, and Evolved Multimedia Broadcast/Multicast Service (eMBMS) which is a next-generation broadcast service. Among these services, the URLLC service is newly considered for the 5G system, while is not being considered for the legacy 4G systems, and as compared with the other services, should meet conditions of ultra-reliability (e.g., a packet error rate of $10^{-5}$) and low latency (e.g., a latency time of 0.5 msec). In order to meet such strict requirements, the URLLC service needs application of a Transmission Time Interval (TTI) shorter than that of the eMBB service, and various operational schemes utilizing this configuration are being considered for the URLLC service.

SUMMARY

The disclosure provides an apparatus and a method for effectively supporting different services in a wireless communication system, on the basis of the discussion as described above.

Also, the disclosure provides an apparatus and a method for minimizing performance degradation due to puncturing of a signal in a wireless communication system.

Also, the disclosure provides an apparatus and a method for providing information on a punctured signal in a wireless communication system.

Further, the disclosure provides an apparatus and a method for providing information on a non-punctured signal in a wireless communication system.

According to various embodiments of the disclosure, an operating method of a base station in a wireless communication system includes: reallocating a resource, allocated to a first service, to a second service in order to provide the second service; transmitting control information related to at least one reference signal punctured for reallocation of the resource; and transmitting the at least one punctured reference signal on a resource different from the resource allocated to the second service.

According to various embodiments of the disclosure, an operating method of a terminal in a wireless communication system includes: receiving control information related to at least one reference signal punctured for reallocation of a resource, allocated to a first service, to a second service in order to provide the second service; and receiving the at least one punctured reference signal on a resource different from the resource allocated to the second service.

According to various embodiments of the disclosure, an apparatus of a base station in a wireless communication system includes: at least one processor configured to reallocate a resource, allocated to a first service, to a second service in order to provide the second service; and a transceiver configured to transmit control information related to at least one reference signal punctured for reallocation of the resource, and transmit the at least one punctured reference signal on a resource different from the resource allocated to the second service.

According to various embodiments of the disclosure, a terminal apparatus in a wireless communication system includes a transceiver configured to receive control information related to at least one reference signal punctured for reallocation of a resource, allocated to a first service, to a second service in order to provide the second service, and receive the at least one punctured reference signal on a resource different from the resource allocated to the second service.

An apparatus and a method according to various embodiments of the disclosure provide control information related to puncturing of a signal of one service among services provided in a preemption-based multiplexing scheme, and thus enable coexistence of different services while minimizing performance degradation, or without performance degradation.

Advantageous effects obtained in the disclosure are not limited to the above-mentioned effects, and other effects not mentioned above can be clearly understood from the following description by those having common knowledge in the technical field to which the disclosure pertains.

DETAILED DESCRIPTION

The terms as used in the disclosure are merely used to describe particular embodiments and are not intended to limit the scope of other embodiments. A singular expression may include a plural expression unless the context clearly indicates otherwise. All terms used herein, including technical terms and scientific terms, have the same meanings as commonly understood by those having common knowledge in the technical field to which the disclosure pertains. Such terms as those defined in a generally-used dictionary among the terms as used in the disclosure are to be interpreted to have the meanings identical or similar to the contextual meanings in the relevant field of art, and are not to be interpreted to have ideal or excessively formal meanings unless clearly defined in the disclosure. In some cases, even the term defined in the disclosure should not be interpreted to exclude embodiments of the disclosure.

In various embodiments of the disclosure as described hereinafter, a hardware-based approach will be described as an example. However, various embodiments of the disclosure include technology that uses both hardware and software, and thus do not exclude a software-based approach.

Hereinafter, the disclosure relates to an apparatus and a method for supporting different services in a wireless communication system. Specifically, in the disclosure, technology for solving problems, which may occur according to coexistence of different services in a wireless communication system, will be described.

Terms in the following description are used for convenience of description and illustrative purposes to refer to: signals; channels; control information; network entities; elements of an apparatus; and the like. Accordingly, the disclosure is not limited to the following terms and other terms having equivalent technical meanings may be used.

Further, in the disclosure, various embodiments are described using the terms used in some communication standards (e.g., a Long-Term Evolution (LTE), LTE-Advanced (LTE-A), and New Radio (NR)), but this configuration is only an example for description. Various embodiments may also be easily modified and applied to another communication system.

Figure 1:
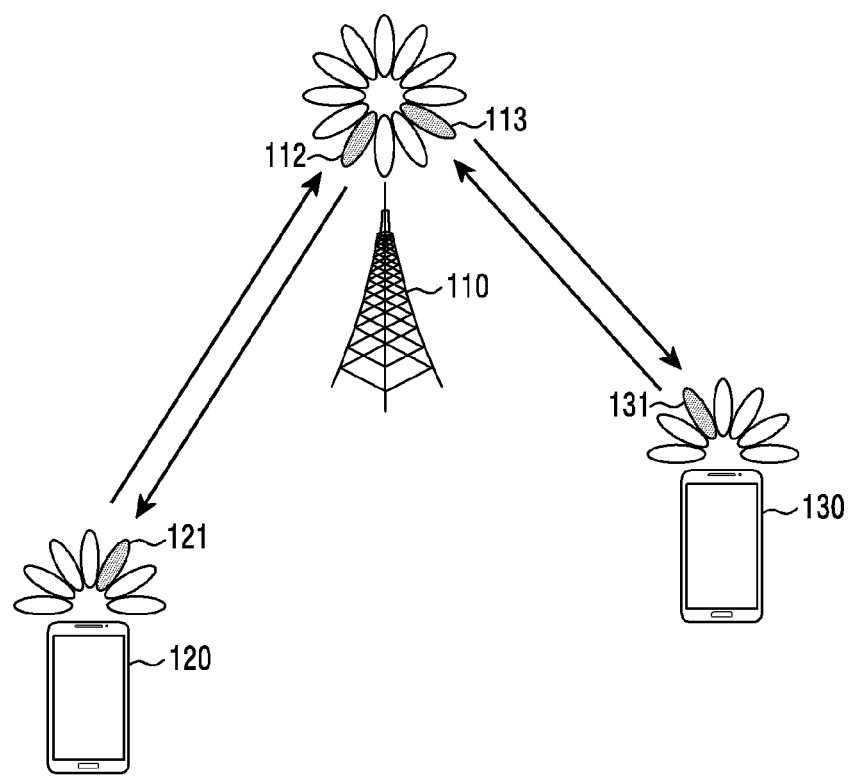
FIG. 1 illustrates a wireless communication system according to various embodiments of the disclosure.

FIG. 1 illustrates a wireless communication environment according to various embodiments of the disclosure. FIG. 1 illustrates an example of a base station 110, a terminal 120, and a terminal 130 as some of nodes using a wireless channel in a wireless communication system. FIG. 1 illustrates only one base station, but may further include another base station identical or similar to the base station 110.

The base station 110 is a network infrastructure which provides radio access to the terminals 120 and 130. The base station 110 has a coverage defined by a predetermined geographic area based on the distance over which a signal can be transmitted. The base station 110 may be referred to as an "Access Point (AP)", an "eNodeB (eNB)", a "5th generation node (5G node)", a "wireless point", a "Transmission/Reception Point (TRP)", or other terms having an equivalent technical meaning.

Each of the terminals 120 and 130 is an apparatus used by a user, and performs communication with the base station 110 through a wireless channel. In some cases, at least one of the terminals 120 and 130 may be operated without user involvement. That is, at least one of the terminals 120 and 130 is an apparatus that performs Machine-Type Communication (MTC), and may not be carried by a user. Each of the terminals 120 and 130 may be referred to as a "User Equipment (UE)", a "mobile station", a "subscriber station", a "remote terminal", a "wireless terminal", a "user device", or other terms having an equivalent technical meaning.

According to an embodiment, the base station 110 and the terminals 120 and 130 may transmit and receive radio signals in a millimeter wave (mmWave) band (e.g., 28 GHz, 30 GHz, 38 GHz, or 60 GHz). In this example, in order to improve a channel gain, the base station 110 and the terminals 120 and 130 may perform beamforming. In this example, the beamforming may include transmission beamforming and reception beamforming. That is, the base station 110 and the terminals 120 and 130 may assign directivity to a transmission signal or a reception signal. To this end, the base station 110 and the terminals 120 and 130 may select serving beams 112, 113, 121, and 131 through a beam search procedure or a beam management procedure. After the serving beams 112, 113, 121, and 131 are selected, subsequent communication may be performed through a resource in a Quasi-Co-Located (QCL) relationship with a resource for transmission of the serving beams 112, 113, 121, and 131. However, according to another embodiment, the base station 110, the terminal 120, and the terminal 130 may not perform beamforming.

When large-scale properties of a channel, through which a symbol on a first antenna port has been delivered, can be inferred from a channel through which a symbol on a second antenna port has been delivered, the first and second antenna ports may be regarded as having a QCL relationship. For example, the large-scale properties may include at least one of a delay spread, a Doppler spread, a Doppler shift, an average gain, an average delay, and a spatial receiver parameter.

Figure 2:
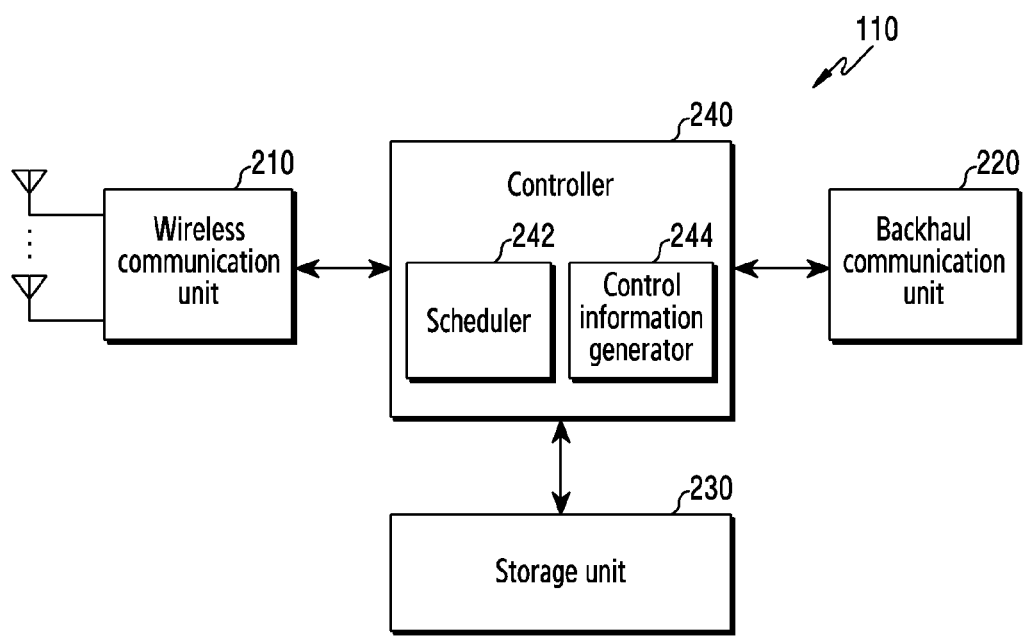
FIG. 2 illustrates a configuration of a base station in a wireless communication system according to various embodiments of the disclosure.

FIG. 2 illustrates a configuration of a base station in a wireless communication system according to various embodiments of the disclosure. The configuration illustrated in FIG. 2 may be understood as a configuration of the base station 110. The term " . . . unit", the term ending with the suffix " . . . or" or " . . . er", or the like, which is used below, may signify a unit of processing at least one function or operation, and this configuration may be implemented in hardware, software, or as a combination of hardware and software.

Referring to FIG. 2, the base station 110 may include a wireless communication unit 210, a backhaul communication unit 220, a storage unit 230, and a controller 240.

The wireless communication unit 210 is configured to perform functions for transmitting or receiving a signal through a wireless channel. For example, the wireless communication unit 210 is configured to perform a function of conversion between a baseband signal and a bit stream according to a physical layer standard of the system. For example, the wireless communication unit 210 is configured to, when data is transmitted, generate complex symbols by encoding and modulating a transmission bit stream. Also, the wireless communication unit 210 is configured to, when data is received, reconstruct a reception bit stream by demodulating and decoding a baseband signal. Further, the wireless communication unit 210 is configured to up-convert a baseband signal into a Radio Frequency (RF) band signal and then transmit the RF band signal through an antenna, and is configured to down-convert an RF band signal received through the antenna into a baseband signal.

To this end, the wireless communication unit 210 may include a transmission filter, a reception filter, an amplifier, a mixer, an oscillator, a Digital-to-Analog Converter (DAC), an Analog-to-Digital Converter (ADC), and the like. Also, the wireless communication unit 210 may include multiple transmission/reception paths. Further, the wireless communication unit 210 may include at least one antenna array including multiple antenna elements. In terms of hardware, the wireless communication unit 210 may include a digital unit and an analog unit, and the analog unit may include multiple sub-units according to operating power, an operating frequency, and the like.

As described above, the wireless communication unit 210 transmits and receives signals. Accordingly, the entirety or part of the wireless communication unit 210 may be referred to as a "transmitter", a "receiver", or a "transceiver". Also, in the following description, transmission and reception performed through a wireless channel has a meaning including the execution of the above-described processing by the wireless communication unit 210.

The backhaul communication unit 220 is configured to provide an interface configured to perform communication with other nodes within a network. That is, the backhaul communication unit 220 is configured to convert a bit stream transmitted from the base station 110 to another node, for example, another access node, another base station, a higher node, a core network, and the like, into a physical signal, and is configured to convert a physical signal received from another node into a bit stream.

The storage unit 230 is configured to store data, such as a basic program for operation of the base station 110, an application program, and configuration information. The storage unit 230 may be implemented by a volatile memory, a non-volatile memory, or a combination of a volatile memory and a non-volatile memory. Also, the storage unit 230 is configured to provide stored data in response to a request of the controller 240.

The controller 240 is configured to control an overall operation of the base station 110. For example, the controller 240 is configured to transmit and receive signals through the wireless communication unit 210 or through the backhaul communication unit 220. Also, the controller 240 is configured to record data in the storage unit 230 and read the recorded data therefrom. Further, the controller 240 may be configured to perform functions of a protocol stack required by the communication standard. To this end, the controller 240 may include at least one processor.

According to various embodiments, the controller 240 may include a scheduler 242 configured to allocate resources in order to support different services, and a control information generator 244 configured to generate control information for coexistence of services. According to various embodiments, the scheduler may reallocate a resource, allocated to a first service, in order to provide a second service. Accordingly, a signal of the first service may be punctured, and the control information generator 244 may generate related control information. In this example, the scheduler 242 and control information generator 244 are an instruction set or code stored in the storage unit 230, and may be an instruction/code at least temporarily residing in the controller 240, a storage space configured to store the instruction/code, or a part of circuitry configuring the controller 240. Further, the controller 240 may control the base station 110 to perform operations according to various embodiments described below.

Figure 3:
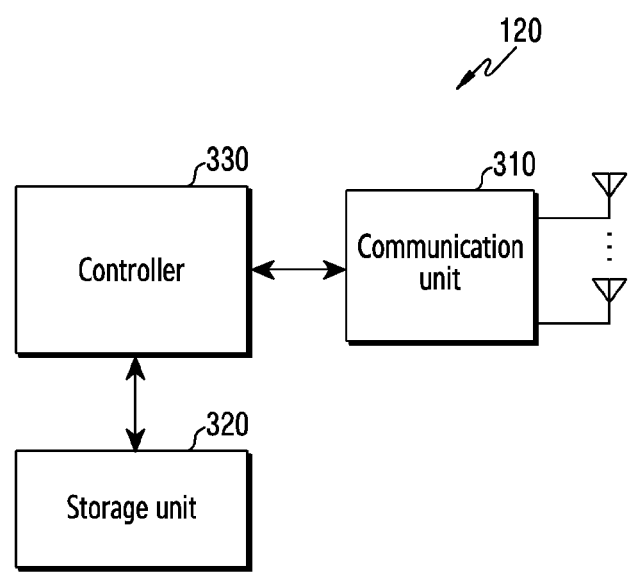
FIG. 3 illustrates a configuration of a terminal in a wireless communication system according to various embodiments of the disclosure.

FIG. 3 illustrates a configuration of a terminal in a wireless communication system according to various embodiments of the disclosure. The configuration illustrated in FIG. 3 may be understood as a configuration of the terminal 120. The term " . . . unit", the term ending with the suffix " . . . or" or " . . . er", or the like, which is used below, may signify a unit of processing at least one function or operation, and this configuration may be implemented in hardware, software, or as a combination of hardware and software.

Referring to FIG. 3, the terminal 120 includes a communication unit 310, a storage unit 320, and a controller 330.

The communication unit 310 is configured to perform functions for transmitting or receiving a signal through a wireless channel. For example, the communication unit 310 is configured to perform a function of conversion between a baseband signal and a bit stream according to a physical layer standard of the system. For example, the communication unit 310 is configured to, when data is transmitted, generate complex symbols by encoding and modulating a transmission bit stream. Also, the communication unit 310 is configured to, when data is received, reconstruct a reception bit stream by demodulating and decoding a baseband signal. Further, the communication unit 310 is configured to up-convert a baseband signal into an RF band signal and then transmit the RF band signal through an antenna, and is configured to down-convert an RF band signal received through the antenna into a baseband signal. For example, the communication unit 310 may include a transmission filter, a reception filter, an amplifier, a mixer, an oscillator, a DAC, an ADC, and the like.

Also, the communication unit 310 may include multiple transmission/reception paths. Further, the communication unit 310 may include at least one antenna array including multiple antenna elements. In terms of hardware, the wireless communication unit 310 may include a digital circuitry and an analog circuitry (e.g., a Radio Frequency Integrated Circuit (RFIC)). In this example, the digital circuitry and the analog circuitry may be implemented as one package. Also, the communication unit 310 may include multiple RF chains. Further, the communication unit 310 may perform beamforming.

As described above, the communication unit 310 transmits and receives signals. Accordingly, the entirety or part of the communication unit 310 may be referred to as a "transmitter", a "receiver", or a "transceiver". Also, in the following description, transmission and reception performed through a wireless channel has a meaning including the execution of the above-described processing by the communication unit 310.

The storage unit 320 is configured to store data, such as a basic program for operation of the terminal 120, an application program, and configuration information. The storage unit 320 may be implemented by a volatile memory, a non-volatile memory, or a combination of a volatile memory and a non-volatile memory. Also, the storage unit 320 is configured to provide stored data in response to a request of the controller 330.

The controller 330 is configured to control an overall operation of the terminal 120. For example, the controller 330 is configured to transmit and receive signals through the communication unit 310. Also, the controller 330 is configured to record data in the storage unit 320 and read the recorded data therefrom. Further, the controller 330 may be configured to perform functions of a protocol stack required by the communication standard. To this end, the controller 330 may include at least one processor or a microprocessor, or may be part of a processor. In addition, the controller 330 and a part of the communication unit 310 may be referred to as a "Communication Processor (CP)". In particular, according to various embodiments, the controller 330 may control the terminal 120 to analyze control information related to puncturing of a signal received from the base station or processing of a reference signal received therefrom and decode and demodulate data on the basis of the control information. For example, the controller 330 may control the terminal 120 to perform operations according to various embodiments described below.

Figure 4:
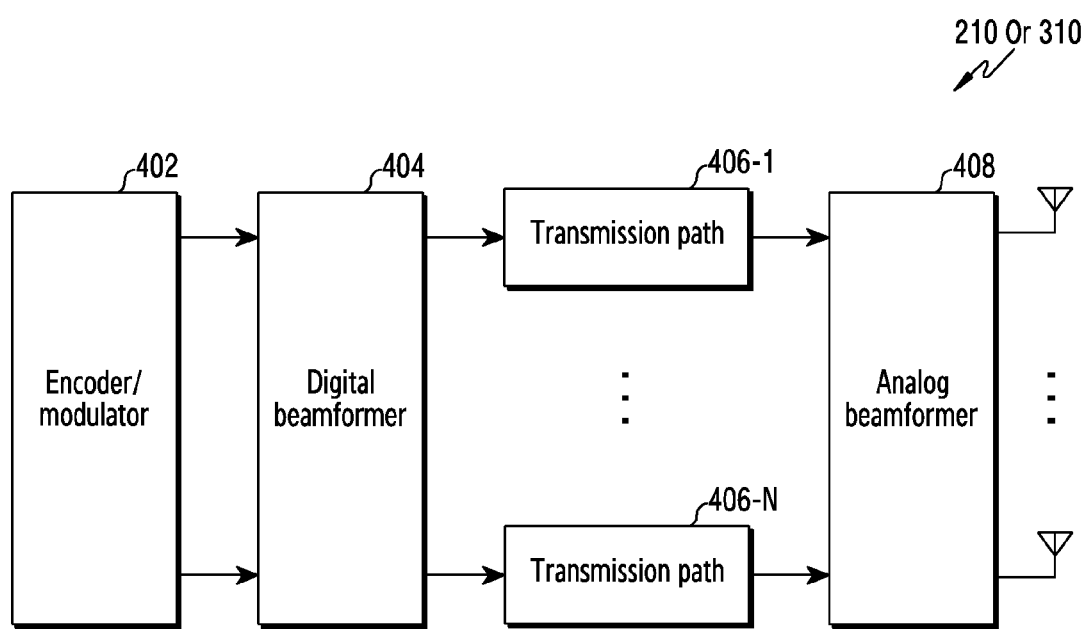
FIG. 4 illustrates a configuration of a communication unit in a wireless communication system according to various embodiments of the disclosure.

FIG. 4 illustrates a configuration of a communication unit in a wireless communication system according to various embodiments of the disclosure. FIG. 4 illustrates an example of a specific configuration of the wireless communication 210 of FIG. 2 or the wireless communication unit 210 of FIG. 3. Specifically, FIG. 4 illustrates a part of the wireless communication 210 of FIG. 2 or the communication unit 310 of FIG. 3, and illustrate examples of elements configured to perform beamforming.

Referring to FIG. 4, the wireless communication unit 210 or the communication unit 310 includes an encoder/modulator 402, a digital beamformer 404, multiple transmission paths 406-1 to 406-N, and an analog beamformer 408.

The encoder/modulator 402 performs channel encoding. For channel encoding, at least one of a Low-Density Parity- Check (LDPC) code, a convolution code, and a polar code may be used. The encoder/modulator 402 generates modulation symbols by performing constellation mapping.

The digital beamformer 404 performs beamforming on a digital signal (e.g., modulation symbols). To this end, the digital beamformer 404 multiplies the modulation symbols by beamforming weights. In this example, the beamforming weights may be used to change the magnitude and phrase of the signal, and may be referred to as a "precoding matrix" or a "precoder". The digital beamformer 404 outputs the digitally beamformed modulation symbols to the multiple transmission paths 406-1 to 406-N. In this example, according to a Multiple-Input Multiple-Output (MIMO) transmission scheme, the modulation symbols may be multiplexed, or the same modulation symbols may be provided to the multiple transmission paths 406-1 to 406-N.

The multiple transmission paths 406-1 to 406-N convert the digitally beamformed digital signals into analog signals. To this end, each of the multiple transmission paths 406-1 to 406-N may include an Inverse Fast Fourier Transform (IFFT) calculation unit, a Cyclic-Prefix (CP) inserter, a DAC, and an up-converter. The CP inserter is for an Orthogonal Frequency Division Multiplexing (OFDM) scheme, and may be omitted when another physical layer scheme (e.g., a Filter Bank Multi-Carrier (FBMC)) is applied. That is, the multiple transmission paths 406-1 to 406-N provide independent signal processing processes for multiple streams generated through the digital beamforming. However, according to an implementation scheme, some of the elements of the multiple transmission paths 406-1 to 406-N may be used in common.

The analog beamformer 408 performs beamforming on analog signals. To this end, the digital beamformer 404 multiplies the analog signals by beamforming weights. In this example, the beamforming weights are used to change the magnitude and phrase of the signal.

When the wireless communication system as illustrated in FIG. 1 is a $5^{th}$ Generation (5G) communication system, the base station 110 and the terminals 120 and 130 may perform communication according to the 5G technical standards. The 5G communication system has a very broad band in comparison with the legacy $3^{rd}$ Generation (3G) communication system and the legacy $4^{th}$ Generation (4G) (e.g., Long-Term Evolution (LTE) or LTE-Advanced (LTE-A)) communication system. Further, for each of the legacy 3G communication system and the legacy 4G communication system, technical standards are defined in consideration of support for backward compatibility, but for the 5G communication system, technical standards are defined in consideration of forward compatibility.

The 5G communication system largely defines use cases of three services. The three services defined by the 5G communication system are as follows: firstly, the Enhanced Mobile Broadband (eMBB) service which is data communication based on enhanced transmission speed; secondly, the Ultra-Reliable Low-Latency Communication (URLLC) service based on ultra-low latency and ultra-high reliability; and thirdly, the Enhanced Machine-Type Communication (eMTC) service which, as communication based on massive Internet of things (IoT), is a data communication service which makes it possible to establish wireless connections between objects without any direct manipulation or involvement of human beings and acquire and deliver necessary information anytime and anywhere.

The above-described three services may be simultaneously supported by one base station 110. Accordingly, for example, the terminal 120 may receive the eMBB service, and the terminal 130 may receive the URLLC service. Hereinafter, for convenience of description, a terminal which receives the eMBB service may be referred to as an "eMBB terminal", and a terminal which receives the URLLC service may be referred to as a "URLLC terminal".

Hereinafter, for convenience of description, the eMBB service may be referred to as one of "data communication", "data communication service", or other terms having equivalent technical meanings, and although the respective terms are interchangeably used, the terms should be understood to have the same meaning. Also, the URLLC service may be referred to as one of "ultra-low latency service", "highly reliable service", "ultra-low latency communication", "highly reliable communication", or other terms having equivalent technical meanings, and although the respective terms are interchangeably used, the terms should be understood to have the same meaning. Further, the eMTC service may be referred to as one of "IoT", "IoT service", or other terms having equivalent technical meanings, and although the respective terms are interchangeably used, the terms should be understood to have the same meaning.

In order to meet ultra-reliability and low latency required for the URLLC service, application of a Transmission Time Interval (TTI), which is shorter than that of the eMBB service, to the URLLC service, and various operational schemes are discussed. For example, a scenario in which, in a downlink network environment, an eMBB service is scheduled and operated with reference to an eMBB slot and an URLLC service is scheduled and operated with reference to a URLLC slot shorter than the eMBB slot is being considered. In this scenario, the base station may be placed in a situation in which, while the base station transmits pre-scheduled eMBB data, the base station should transmit URLLC packets. When the base station should transmit the URLLC packets while transmitting the eMBB data, the base station 110 should reallocate some of resources, allocated to the eMBB service, in order to provide the URLLC service due to the characteristics of the URLLC service requiring low latency.

As described above, when the base station reallocates some of the resources, already allocated to the eMBB service, in order to transmit the URLLC data instead of the eMBB data, a terminal receiving the eMBB data may mistake the URLLC data for the eMBB data and may process the URLLC data as the eMBB data. In this example, degradation may occur in performance for reception of data by the terminal. In particular, when the base station transmits the URLLD data instead of the eMBB data, if a Demodulation Reference Signal (DMRS) for eMBB is removed, a serious error may occur in channel estimation of the eMBB service. In this example, similarly, serious performance degradation may occur in the eMBB service. In order to prevent performance degradation of the eMBB service caused by removal of a DMRS, the base station may allocate a resource for transmitting URLLC data so as to avoid a DMRS for the eMBB service. Accordingly, the base station may transmit URLLC data without damaging a DMRS.

Hereinafter, in various embodiments of the disclosure, processing of a reference signal and signaling of related control information when at least two different services are supported will be described. In the following description, at least two different services are expressed as a "first service" and a "second service", or a "first type service" and a "second type service", and thus are distinguished from each other. Specific examples of a first service and a second service may change, and for example, the first service may be an eMBB service and the second service may be a URLLC service.

Before a description of processing of a reference signal and signaling of related control information according to various embodiments, a basic scheme for resource allocation between a first service and a second service will be described below with reference to FIG. 5A and FIG. 5B.

Figure 5A:
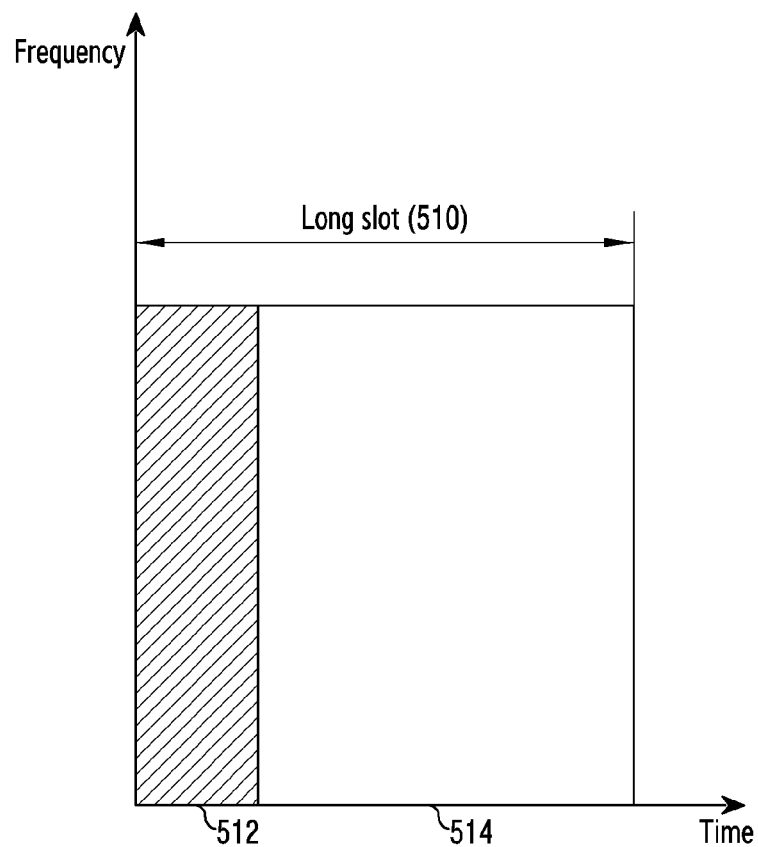
FIG. 5A illustrates an example of allocation of resources for a first service in a wireless communication system according to various embodiments of the disclosure.

FIG. 5A illustrates an example of allocation of resources for a first service in a wireless communication system according to various embodiments of the disclosure. In FIG. 5A, the horizontal axis represents a time resource, and the vertical axis represents a frequency resource. Referring to FIG. 5A, in a wireless communication system, resources may be allocated in a unit of frequency resource and in a unit of time resource. In this example, allocation units of time resources may be identical to, or different from, each other according to services. FIG. 5A illustrates an example of allocating a time resource to the first service. In the first service, a unit of allocation of a time resource is a long slot 510. According to another embodiment, a slot may be replaced by a TTI. The long slot 510 allocated to the first service includes: a region 512 for transmission of a control channel for transmission of control information (e.g., an eMBB control channel); and a region 514 for transmission of data of the first service.

Figure 6:
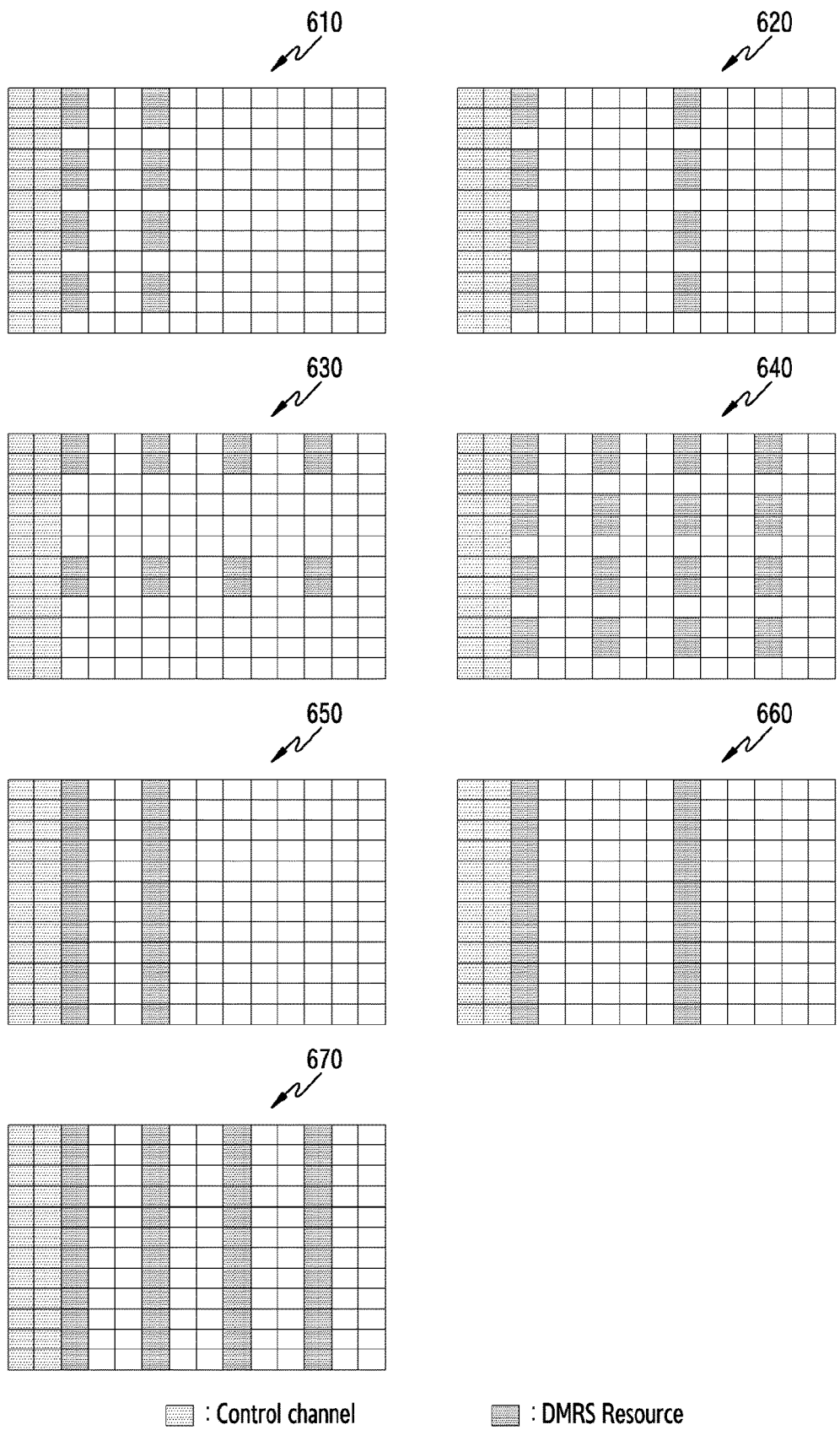
FIG. 6 illustrates examples of mapping patterns of a reference signal in a wireless communication system according to various embodiments of the disclosure.

The region 514 is a resource for transmission of a data signal. In addition, in the region 514, at least one reference signal may be transmitted together with a data signal so as to allow acquisition of channel information for demodulation and decoding of a data signal. A reference signal may be a DMRS. Mapping patterns of a reference signal may be variously defined, and one of the multiple mapping patterns may be selectively applied according to an environment of a terminal, for example, a channel situation and a service characteristic. For example, multiple mapping patterns may be defined as illustrated in FIG. 6. FIG. 6 illustrates examples of mapping patterns of a reference signal in a wireless communication system according to various embodiments of the disclosure. FIG. 6 illustrates examples of patterns of a reference signal (e.g., a DMRS) available for a first service (e.g., an eMBB service). Referring to FIG. 6, multiple reference signals are mapped to the remaining resources except for a control channel. In this example, in patterns 610, 620, 630, 640, 650, 660, and 670, time-axis intervals of reference signals and frequency-axis intervals thereof may be different.

When the pattern 610 is compared with the pattern 620, the pattern 610 has a time-axis distribution of reference signals different from that of the pattern 620. The difference between the pattern 610 and the pattern 620 is a result of consideration of delay of signal processing due to channel estimation. When a reference signal is mapped at a relatively preceding position on the time axis as in the pattern 601, delay of signal processing can be reduced. There is also a difference between the pattern 650 and the pattern 660 on the basis of a similar principle.

When the pattern 630 is compared with the pattern 640, the pattern 630 has frequency-axis intervals of reference signals different from those of the pattern 640. The difference between the pattern 630 and the pattern 640 is a result of consideration of a frequency-axis change of a channel. When a resolution of reference signals is high on the frequency axis as in the pattern 640, a channel estimation error due to a large channel change on the frequency axis can be reduced. There is also a difference between the pattern 610 and the pattern 650 on the basis of a similar principle, and there is also a difference between the pattern 620 and the pattern 660 on the basis of a similar principle.

When the pattern 660 is compared with the pattern 670, the pattern 660 has time-axis intervals of reference signals different from those of the pattern 670. The difference between the pattern 660 and the pattern 670 is a result of consideration of a time-axis change of a channel. In this example, a time-axis change of a channel may be expressed as a magnitude of a Doppler frequency. When a resolution of reference signals is high on the time axis as in the pattern 670, a channel estimation error due to a large channel change on the time axis can be reduced. There is also a difference between the pattern 620 and the pattern 640 on the basis of a similar principle.

Figure 5B:
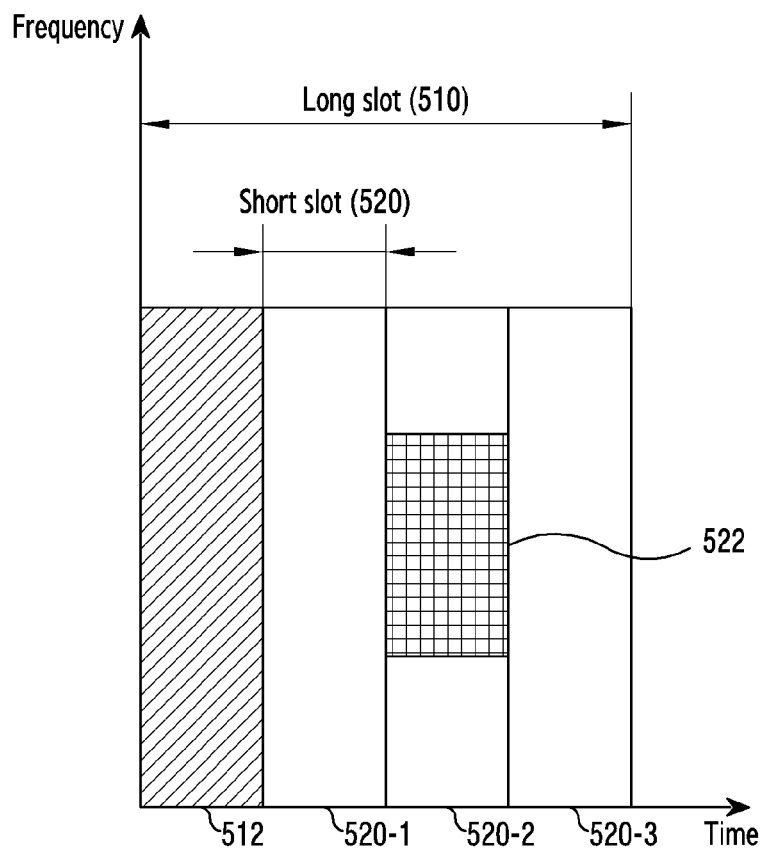
FIG. 5B illustrates an example of assigning a second service to a resource allocation region of a first service in a wireless communication system according to various embodiments of the disclosure.

FIG. 5B illustrates an example of assigning a second service to a resource allocation region of a first service in a wireless communication system according to various embodiments of the disclosure. In FIG. 5B, similarly to FIG. 5A, a frequency resource unit may be configured using a predetermined frequency band or a predetermined number of frequency resources. A resource for the first service may be allocated in a unit of long slot 510, as described above. In contrast, referring to FIG. 5B, a resource for a second service may be allocate in a unit of short slot 520 rather than in a unit of long slot 510. The short slot 520 may be referred to as a "mini-slot". The region 514 for transmission of data in the long slot 510 may include at least two short slots 520's. FIG. 5B illustrates an example in which the region 514 includes three short slots 520-1, 520-2, and 520-3. According to another embodiment, a data transmission region 514 of the long slot 510 may include short slots, the number of which is less than 3 or is greater than or equal to 4.

As described above, when the first service is provided to a particular terminal, a base station may allocate resources in a unit of long slot 510. As exemplified in FIG. 5A, one long slot 510 may include the region 512 for a first service control channel for transmission of control information, and the region 514 for first service data. The base station transmits control information necessary to receive first service data, using the region 512. Accordingly, the terminal, which is to receive first service data, may first receive control information in the region 512, and may demodulate and decode the first service data on the basis of the control information.

Second service data may include data requiring ultra-low latency and high reliability. Accordingly, when second service data is generated for a sudden short period, the base station should relatively urgently transmit the second service data. Therefore, as exemplified in FIG. 5B, resources may be allocated in a unit of short slot 520, and thus data may be transmitted with short delay. Since second service data is transmitted in a unit of short slot, there may be a case in which other terminals have already been allocated available resources, for example, resources capable of transmitting second service data. In this example, in consideration of service characteristics of the first service and the second service, the second service has a priority higher than that of the first service. Therefore, the base station should transmit second service data by using some of the resources (e.g., the region 514 of the long slot 510) already allocated to the first service.

FIG. 5B illustrates an example of allocating some of first service resources, allocated to a particular terminal, in order to transmit second service data. In other words, FIG. 5B illustrates an example of a situation in which second service data is desired to be transmitted in a part of the region 514 for first service data but the region 514 has already been allocated for first service data to be transmitted to the particular terminal. In this example, the base station may remove data allocated to a part of the region 514 for the first service data, and may transmit second service data 522 at a position where the data has been removed. That is, the first service and the second service may be provided in a pre-emption-based multiplexing scheme. In this example, the term "remove" may be expressed as "puncturing". When the base station punctures data allocated to a part of the period 514 for the first service data and inserts the second service data 522 at a position, at which the data has been removed, and performs transmission, first service data which is to be received by the terminal and includes data other than data of the terminal itself may be transmitted to the terminal which receives the first service. Hereinafter, for convenience of description, a terminal receiving the first service may be referred to as a "first service terminal".

As described above, when the second service data is transmitted in the long slot 510 allocated to the first service terminal, the first service terminal may demodulate and decode a signal including the second service data. In this example, the first service terminal may fail to demodulate and decode the data. Due to the failure of demodulation and decoding, the first service terminal may request the base station for retransmission. However, when a Hybrid Automatic Repeat Request (HARQ) scheme for combining the received data is employed, demodulation and decoding fail again due to a combination with a signal transmitted to another terminal, and retransmissions, the frequency of which is larger than in a general case, may be requested. As a result, due to the second service data, a large number of retransmissions are needed in the system, and thus problems of a waste of a band and unnecessary consumption of power by the terminal may occur.

In order to prevent a reception error of the first service terminal due to transmission of second service data, consideration may be given to a method in which the base station notifies of whether a previously-transmitted signal includes the second service data and the position of the second service data through a control channel (e.g., the region 512) of the first service during retransmission. In this example, the terminal removes a part corresponding to the second service data from a previously-received signal by using the information acquired through the control channel for retransmitted data, and combines the remaining part of the previously-received signal and a newly-received retransmitted signal, so that performance can be improved.

However, despite of notification of whether the second service data exists and the position of the second service data during retransmission, it is expected that a failure of reception of an initially-transmitted signal will not be improved and at least one retransmission will be requested. In order to solve this problem, when the second service is provided using some of the resources allocated to the first service as illustrated in FIG. 5B, the base station may explicitly or implicitly transmit indication information to the first service terminal so that the first service terminal can recognize transmission of second service data. In this example, since second service data can be transmitted after a control channel of the first service is transmitted (e.g., after the region 512), according to an embodiment, a part of a resource region (e.g., the region 514) for transmission of first service data after transmission of second service data may be fixedly or variably used to transmit indication information. According to another embodiment, indication information may be transmitted together with control information for data of a first service in a control channel (e.g., the region 512) of the first service. In this configuration, according to various embodiments, indication information may be broadcast or unicast to at least one terminal, affected by second service data, through a control channel (e.g., a Physical Downlink Control Channel (PDCCH)). When the indication information is transmitted, the terminal may demodulate and decode the remaining data except for the second service data, so that performance can be improved.

However, as described above, even when the first service terminal recognizes, through the indication information, whether the second service data exists, there may be a case in which performance for reception of the first service cannot be significantly improved. For example, when signals, which can significantly affect performance for reception of the first service, are removed for support for the second service, a performance improvement due to indication information may not be significant. Specifically, when a first service signal punctured for transmission of second service data includes a reference signal (e.g., a DMRS), although a terminal knows the position of the second service data in a signal received by the terminal, decoding performance may be significantly degraded. This is because channel estimation performance is significantly degraded due to puncturing of a reference signal.

Figure 7:
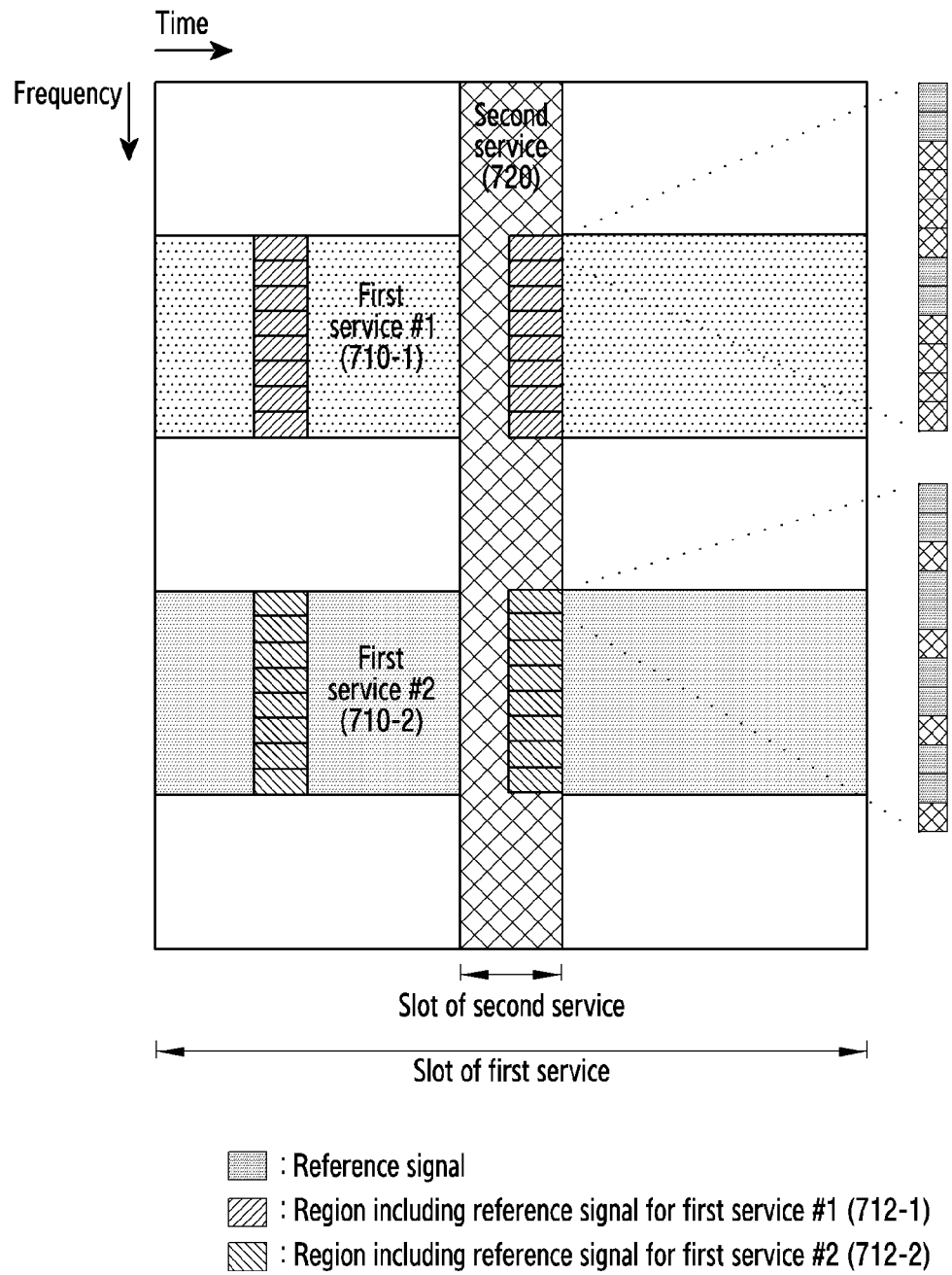
FIG. 7 illustrates an example of a situation in which a resource of a second service is allocated to a symbol including a reference signal resource for a first service in a wireless communication system according to various embodiments of the disclosure.

A case in which a reference signal is punctured may occur in a situation as illustrated in FIG. 7. FIG. 7 illustrates an example of a situation in which a resource of a second service is allocated to a symbol including a reference signal resource for a first service in a wireless communication system according to various embodiments of the disclosure. Referring to FIG. 7, two first services 710-1 and 710-2 are provided in a slot (e.g., the long slot 510) of the first service. Reference signals are mapped to some regions 712-1 and 712-2 among resources allocated to the first services 710-1 and 710-2. One sub-unit constituting the regions 712-1 and 712-2 may be defined as occupying one symbol on the time axis and occupying multiple subcarriers on the frequency axis. For example, one sub-unit may occupy subcarriers, the number of which is identical to the number of subcarriers of one Physical Resource Block (PRB). Accordingly, PRB may be used as a unit for expressing positions of the regions 712-1 and 712-2 on the frequency axis.

In one sub-unit constituting the regions 712-1 and 712-2, at least one reference signal is arranged according to a predetermined pattern. For example, a pattern may be one of the patterns 610, 620, 630, 640, 650, 660, and 670 illustrated in FIG. 6. In this example, since channel environments of terminals are different from each other, different reference signal patterns are applied to the first service #1 710-1 and the second service #2 710-2. Also, the second service 720 is provided in a slot of the first service, and a slot of the second service occupies resources in the same symbol (e.g., an OFDM symbol) including resources (e.g., Resource Elements (REs)) allocated to reference signals for the first services 710-1 and 710-2. Accordingly, a problem related to puncturing of reference signals may occur.

When reference signals for the first service are punctured, channel estimation errors of first service terminals may be rapidly increased, which may seriously affect error performance. Since a reference signal (e.g., a DMRS) can be applied specifically to a terminal, the situation as illustrated in FIG. 7 may frequently occur. Accordingly, in a situation where a reference signal is likely to be punctured, there is a need for a method for effectively multiplexing a first service and a second service.

Therefore, various embodiments propose technology for, when a first service signal is punctured in some of resources, allocated to a first service, for support for a second service so as to transmit a second service signal, enabling a reduction in degradation of performance for reception of the first service and enabling support for the second service. Specifically, hereinafter, a description will be made of various embodiments relating to: various methods for puncturing a first service signal; control information which should be delivered to a terminal receiving a second service; and operations of a base station and a terminal for supporting the various methods and the control information. Hereinafter, for convenience of description, a terminal receiving a second service may be referred to as a "second service terminal".

Figure 8:
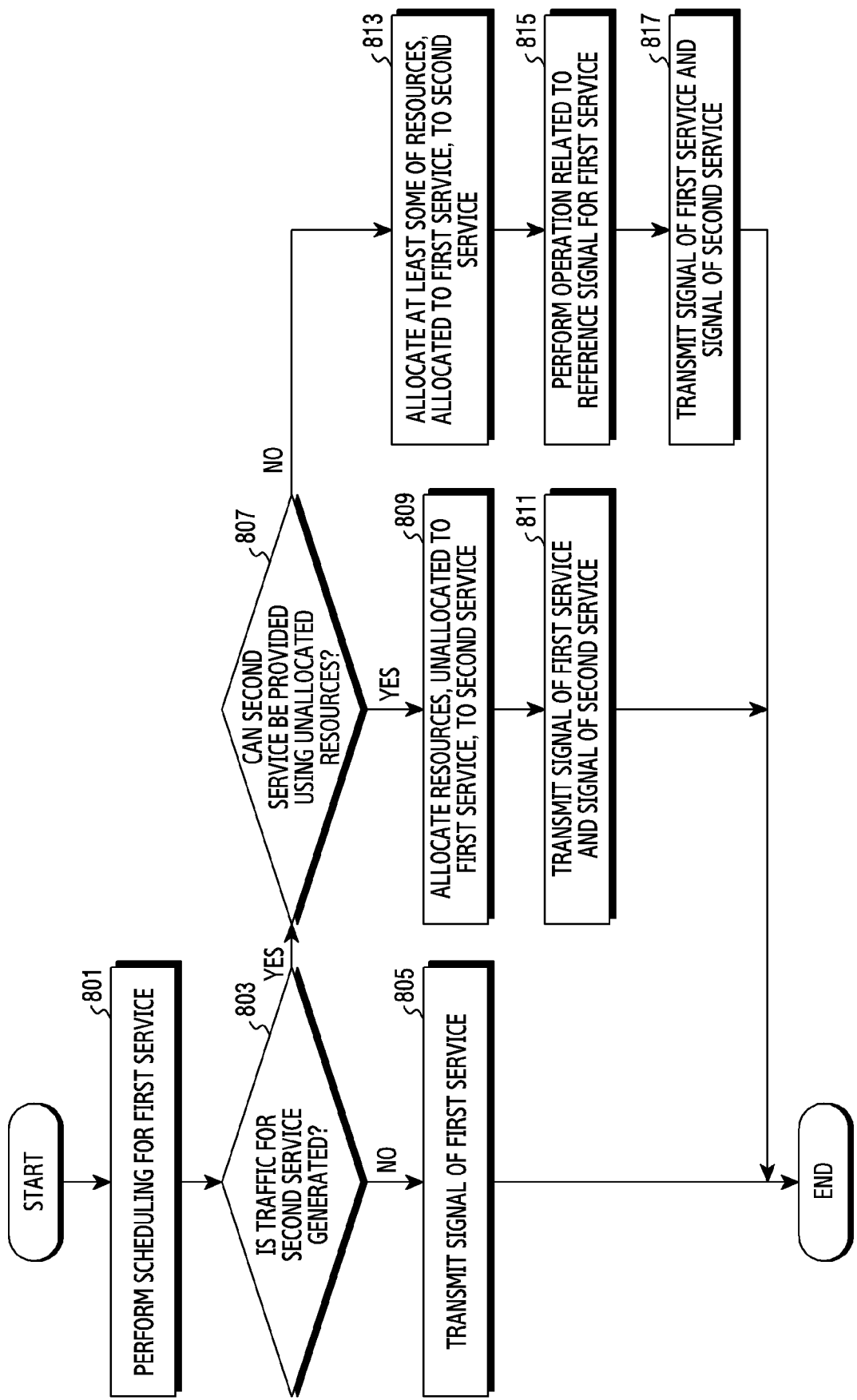
FIG. 8 illustrates an operating method of a base station for providing different services in a wireless communication system according to various embodiments of the disclosure.

FIG. 8 illustrates an operating method of a base station for providing different services in a wireless communication system according to various embodiments of the disclosure. FIG. 8 illustrates an operating method of the base station 110.

Referring to FIG. 8, in operation 801, the base station performs scheduling for a first service. The base station may provide the first service to one or at least two terminals. For the first service, a partial frequency band of a system bandwidth may be allocated to the one or at least two terminals. In this example, a resource allocated to each terminal may occupy a slot (e.g., the long slot 510) of the first service on the time axis.

In operation 803, the base station determines whether traffic for a second service is generated. That is, after performing scheduling for the first service and before transmitting a signal of the first service, the base station may determine whether traffic for the second service is generated. For example, whether traffic for the second service is generated may be determined on the basis of notification from a higher-layer node.

When the traffic for the second service is not generated, in operation 805, the base station transmits a signal of the first service. Since, after performing scheduling for the first service, the traffic for the second service is not generated, it is unnecessary to puncture a signal of the first service. That is, it is not required to puncture a reference signal for the first service. Therefore, the base station may transmit signals of the first service according to the scheduling performed in operation 801.

When the traffic for the second service is generated, in operation 807, the base station determines whether the second service can be provided using unallocated resources. Specifically, the base station may calculate a resource amount necessary to transmit the traffic for the second service, and may verify whether there exist unallocated resources in a region within a maximum delay time allowed by the second service. When the unallocated resources exist, the base station may verify whether the unallocated resources have a size which is larger than or equal to a necessary resource amount.

When the second service can be provided using the unallocated resources, in operation 809, the base station allocates resources, unallocated to the first service, to the second service. In other words, the base station may allocate, to the second service, unoccupied resources unallocated within the maximum allowed delay time from a generation time point of the traffic for the second service.

Then, in operation 811, the base station transmits a signal of the first service and a signal of the second service. Since resources allocated to the second service do not overlap resources allocated to the first service, it is unnecessary to puncture a signal of the first service. In other words, it is not required to puncture a reference signal for the first service. Therefore, the base station may transmit signals of the first service according to the scheduling performed in operation 801, and in addition, may further transmit signals of the second service.

When it is determined in operation 807 that the second service cannot be provided using the unallocated resources, in operation 813, the base station allocates at least some of resources, allocated to the first service, to the second service. That is, the base station determines that signals of the first service are to be punctured, and reallocates the resources, which have been allocated to the punctured signals, to the second service. In this example, the resources reallocated to the second service may include resources in the same symbol including resources having been allocated to reference signals for the first service. According to various embodiments, the punctures signals may include or not include at least one reference signal.

In operation 815, the base station performs an operation related to a reference signal for the first service. According to various embodiments, the base station may perform an operation of preparing for degradation of channel estimation performance due to puncturing of a reference signal, or may perform an operation of notifying of transmission of a reference signal in a slot for the second service. For example, the base station may allocate another resource to the punctured reference signal, or may generate information notifying of the position of the reference signal.

In operation 817, the base station transmits a signal of the first service and a signal of the second service. Since the resources allocated to the first service are reallocated to the second service, at least some of signals of the first service are punctured. Accordingly, the base station may further transmit control information notifying of puncturing of a signal. Further, according to various embodiments, the base station may further transmit control information notifying of the position of a reference signal, or control information notifying of puncturing of a reference signal.

As in the embodiments described with reference to FIG. 8, when a signal of the first service is punctured in order to provide the second service, the base station may perform an operation related to a reference signal for the first service. Accordingly, the base station can reduce performance degradation due to puncturing of a reference signal. Hereinafter, various embodiments of operations related to a reference signal will be described.

According to an embodiment, a reference signal for the first service may not be punctured, and only a data signal may be punctured. In this example, the base station may signal a position of a resource, to which a reference signal for the first service is mapped, to a second service terminal. This is because the second service terminal may mistake a signal received on the resource, to which the reference signal is mapped, for a signal of the second service. Hereinafter, embodiments for notifying of a position of a resource, to which a reference signal is mapped, will be described with reference to FIG. 9A and FIG. 9B. Hereinafter, for convenience of description, a resource, to which a reference signal for the first service is mapped, may be referred to as a "reference signal resource".

Figure 9A:
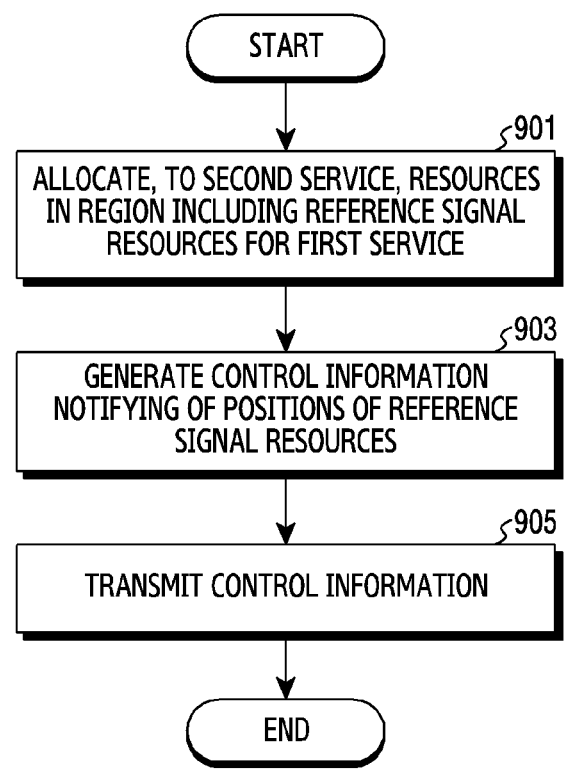
FIG. 9A illustrates an operating method of a base station for notifying of a position of a reference signal in a wireless communication system according to various embodiments of the disclosure.

FIG. 9A illustrates an operating method of a base station for notifying of a position of a reference signal in a wireless communication system according to various embodiments of the disclosure. FIG. 9A illustrates an example of an operating method of the base station 110.

Referring to FIG. 9A, in operation 901, the base station may allocate, to a second service, resources in a region including reference signal resources for a first service. In this example, a reference signal may not be punctured, and reference signals for the first service and signals of the second service may be mapped to the same symbol.

In operation 903, the base station generates control information notifying of positions of reference signal resources. The control information may indicate positions of reference signal resources according to various schemes. For example, positions of reference signal resources may be implicitly or explicitly indicated. When positions of reference signal resources are implicitly indicated, the positions of the reference signal resources may be expressed by at least another parameter. When the positions of the reference signal resources are explicitly indicated, the positions of the reference signal resources may include at least one piece of information among: information on a position of each reference signal (e.g., a bitmap); information on a position of a resource region to which reference signals are mapped; and information on a pattern of reference signals in the resource region. In this example, the resource region may be defined on the basis of a distribution of reference signal resources, or may be defined regardless of the reference signal resources. The control information notifying of positions of reference signal resources is used to allow a second service terminal to avoid reference signals for the first service, and thus may be referred to as "avoidance region information".

In operation 905, the base station transmits the control information. The control information may be transmitted on some of the resources allocated to the second service. In this example, the base station may further transmit information necessary to demodulate and decode a data signal of the second service.

Figure 9B:
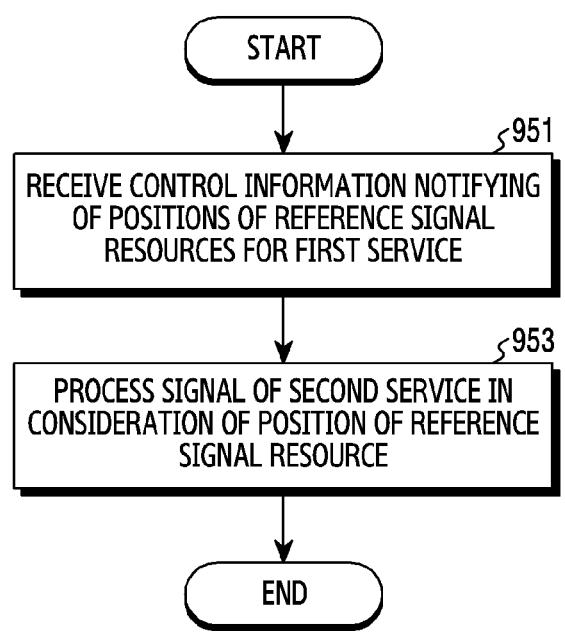
FIG. 9B illustrates an operating method of a terminal for processing a signal in consideration of a position of a reference signal in a wireless communication system according to various embodiments of the disclosure.

FIG. 9B illustrates an operating method of a terminal for processing a signal in consideration of a position of a reference signal in a wireless communication system according to various embodiments of the disclosure. FIG. 9B illustrates an operating method of the terminal 120 or the terminal 130, and illustrates an example of an operating method of a terminal for receiving data of the second service.

Referring to FIG. 9B, in operation 951, the terminal may receive control information notifying of positions of reference signal resources for the first service. The control information may indicate positions of reference signal resources according to various schemes. For example, positions of reference signal resources may be implicitly or explicitly indicated. When positions of reference signal resources are implicitly indicated, the positions of the reference signal resources may be expressed by at least another parameter. When the positions of the reference signal resources are explicitly indicated, the positions of the reference signal resources may include at least one piece of information among: information on a position of each reference signal (e.g., a bitmap); information on a position of a resource region to which reference signals are mapped; and information on a pattern of reference signals in the resource region. In this example, the resource region may be defined on the basis of a distribution of reference signal resources, or may be defined regardless of the reference signal resources.

In operation 953, the terminal processes a signal of the second service in consideration of a position of a reference signal resource. In other words, the second service terminal processes a signal of the second service in consideration of a position of a reference signal resource for the first service. According to reception of the control signal, the terminal may recognize reference signals for the first service mapped in a slot of the second service. Accordingly, the terminal may exclude a signal mapped to a reference signal resource for the first service in a demodulation and decoding process.

According to the embodiments described with reference to FIG. 9A and FIG. 9B, positions of reference signal resources for the first service may be provided from the base station to the second service terminal. Accordingly, the second service terminal may distinguish a signal (e.g., a reference signal) of the first service from a signal of the second service, and may process only the signal of the second service. In this example, the positions of the reference signal resources may be indicated according to various schemes. Hereinafter, various embodiments for notifying of positions of reference signal resources will be described with reference to FIG. 10 to FIG. 13B.

According to an embodiment, control information notifying of positions of reference signal resources may include positions of resource regions, to which reference signals for the first service are mapped, and information on patterns of reference signals in each resource region. In this example, one resource region corresponds to reference signals arranged according to one pattern. Hereinafter, for convenience of description, reference signals arranged according to one pattern may be referred to as a "reference signal set". Hereinafter, embodiments for signaling patterns according to reference signal sets will be described with reference to FIG. 10 to FIG. 11B.

Figure 10:
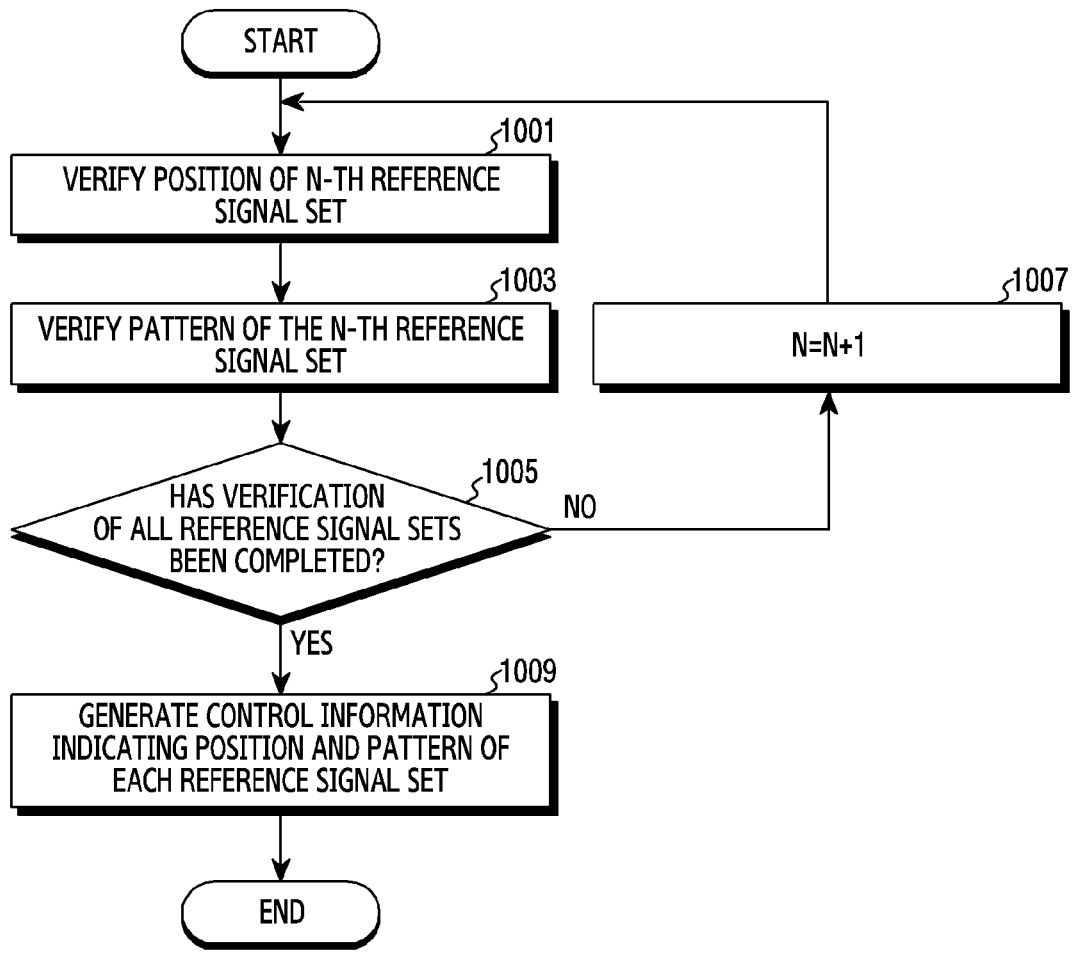
FIG. 10 illustrates an operating method of a base station for notifying of a pattern of reference signals for each reference signal set in a wireless communication system according to various embodiments of the disclosure.

FIG. 10 illustrates an operating method of a base station for notifying of a pattern of reference signals for each reference signal set in a wireless communication system according to various embodiments of the disclosure. FIG. 10 illustrates an example of an operating method of the base station 110.

Referring to FIG. 10, in operation 1001, the base station verifies a position of an n-th reference signal set. In this example, when this procedure is started, n is initialized to be 1. The n-th reference signal set may include resources allocated to reference signals allocated to a particular terminal. For example, a position of a reference signal set may be specified by a start point and a length on the frequency axis.

In operation 1003, the base station verifies a pattern of the n-th reference signal set. A pattern of reference signals may be specified by the number of consecutive reference signals on the frequency axis and an interval between non-consecutive reference signals on the frequency axis. For example, the base station may verify a pattern of the n-th reference signal set by verifying a first service terminal corresponding to the n-th reference signal set and verifying a pattern of reference signals allocated to the verified first service terminal.

In operation 1005, the base station determines whether verification of all reference signal sets has been completed. When all the reference signal sets have not been verified, that is, when a reference signal set to be verified is left, in operation 1007, the base station increases n by 1, and returns to operation 1001.

In contrast, when all the reference signal sets have been verified, in operation 1009, the base station generates control information indicating a position and a pattern of each reference signal set. For example, the position of each reference signal set may be expressed using at least one of an index of a particular resource unit (e.g., PRB, subcarrier, or RE) and the number of the particular resource units, and the pattern of each reference signal set may be expressed using an index of a pattern. In this example, the control information may include: as many position-related information elements as the number of the reference signal sets; and as many pattern-related information elements as the number of the reference signals sets.

In the embodiment illustrated in FIG. 10, control information is generated after positions and patterns of all the reference signal sets are verified. However, according to another embodiment, control information may be sequentially generated whenever a position and a pattern of each reference signal set are verified. In this example, operation 1009 may be replaced by an operation of concatenating, by the base station, information elements each representing a position and a pattern of a corresponding reference signal set.

Figure 11A:
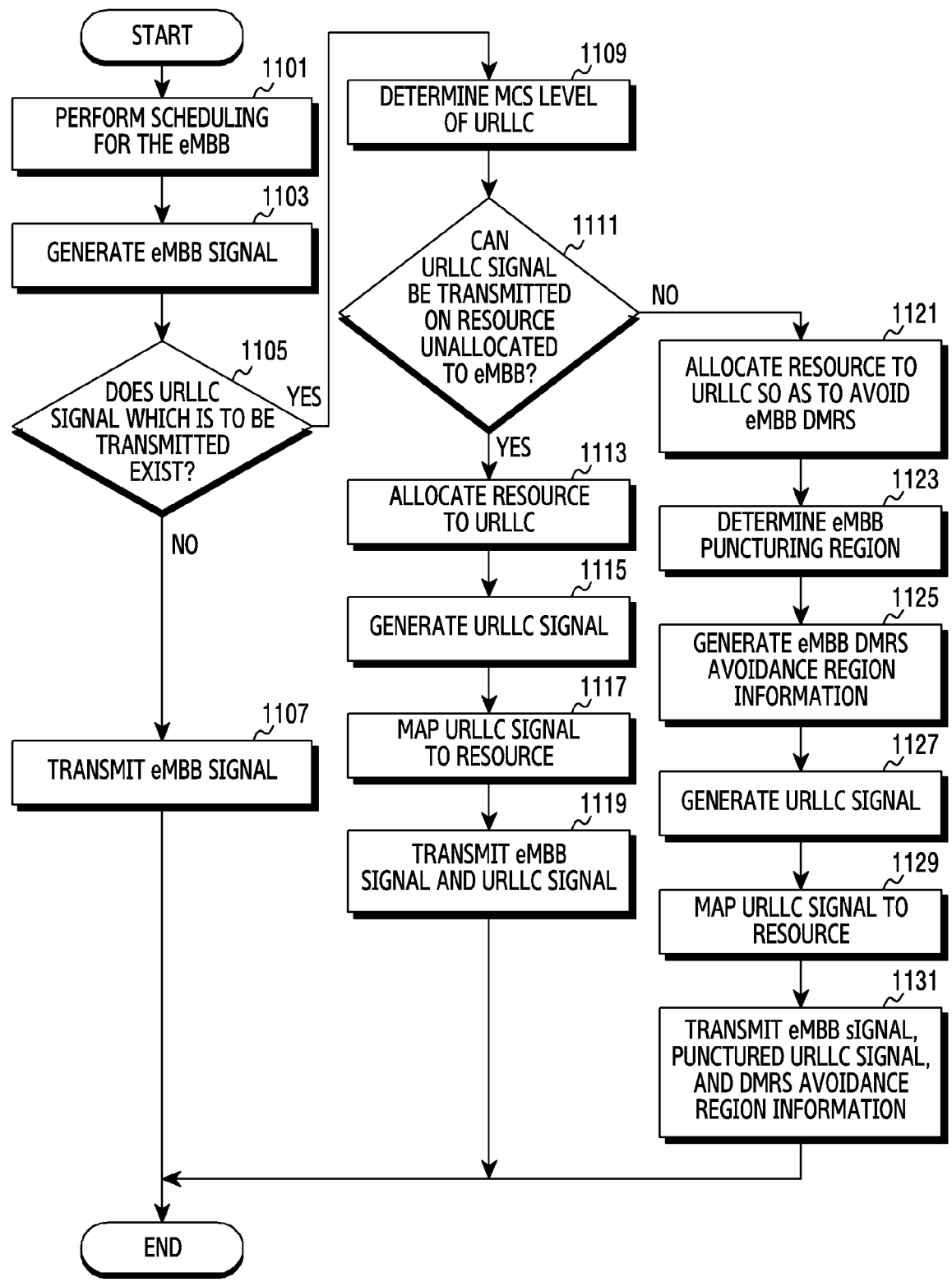
FIG. 11A illustrates a specific operating method of a base station for notifying of a pattern of reference signals for each reference signal set in a wireless communication system according to various embodiments of the disclosure.

FIG. 11A illustrates a specific operating method of a base station for notifying of a pattern of reference signals for each reference signal set in a wireless communication system according to various embodiments of the disclosure. FIG. 11A illustrates an operating method of the base station 110, and illustrates an example of a specific case in which a first service is eMBB and a second service is URLLC.

Referring to FIG. 11A, in operation 1101, the base station performs scheduling for the eMBB. Then, in operation 1103, the base station generates an eMBB signal. In other words, the base station may generate signals to be mapped to resources, by encoding and modulating eMBB data according to a Modulation and Coding Scheme (MCS) determined through the scheduling. Then, in operation 1105, the base station determines whether a URLLC signal which is to be transmitted exists. When the URLLC signal which is to be transmitted does not exist, in operation 1107, the base station transmits an eMBB signal. That is, the base station transmits an eMBB signal according to the scheduling performed in operation 1101.

In contrast, when the URLLC signal which is to be transmitted exists, in operation 1109, the base station determines an MCS level of the URLLC. Then, in operation 1111, the base station determines whether a URLLC signal can be transmitted on a resource unallocated to the eMBB. When a URLLC signal can be transmitted on a resource unallocated to the eMBB, in operation 1113, the base station allocates a resource to the URLLC. In operation 1115, the base station generates a URLLC signal. Then, in operation 1117, the base station maps the URLLC signal to a resource. In other words, the base station maps the signal, generated in operation 1115, to the resource allocated in operation 1113. Then, in operation 1119, the base station transmits the eMBB signal and the URLLC signal.

In contrast, when it is determined in operation 1111 that the URLLC signal cannot be transmitted on the resource unallocated to the eMBB, in operation 1121, the base station allocates a resource to the URLLC so as to avoid an eMBB DMRS. That is, the base station limits reallocated resources so that the base station reallocates some of eMBB resources to the URLLC but DMRS resources are not reallocated. Accordingly, in one symbol, some resources may be allocated to DMRSs for the eMBB, and some resources may be allocated to the URLLC. Then, in operation 1123, the base station determines an eMBB puncturing region. For example, the base station may determine resources, allocated to the URLLC, as an eMBB puncturing region. In operation 1125, the base station generates eMBB DMRS avoidance region information. The DMRS avoidance region information may include DMRS set-specific position information and pattern information. For example, the DMRS avoidance region information may include the information generated in operation 1009 of FIG. 10. Then, in operation 1127, the base station generates a URLLC signal. Then, in operation 1129, the base station maps the URLLC signal to a resource. Then, in operation 1131, the base station transmits the eMBB signal, the URLLC signal, and the DMRS avoidance region information. In this example, the DMRS avoidance region information may be a part of the URLLC signal.

As described with reference to FIG. 11A, some of eMBB signals may be punctured, and a URLLC signal may be transmitted at a position where the eMBB signal has been punctured. When the URLLC signal is transmitted through the procedure exemplified in FIG. 11A, signals may be mapped as illustrated in FIG. 11B.

Figure 11B:
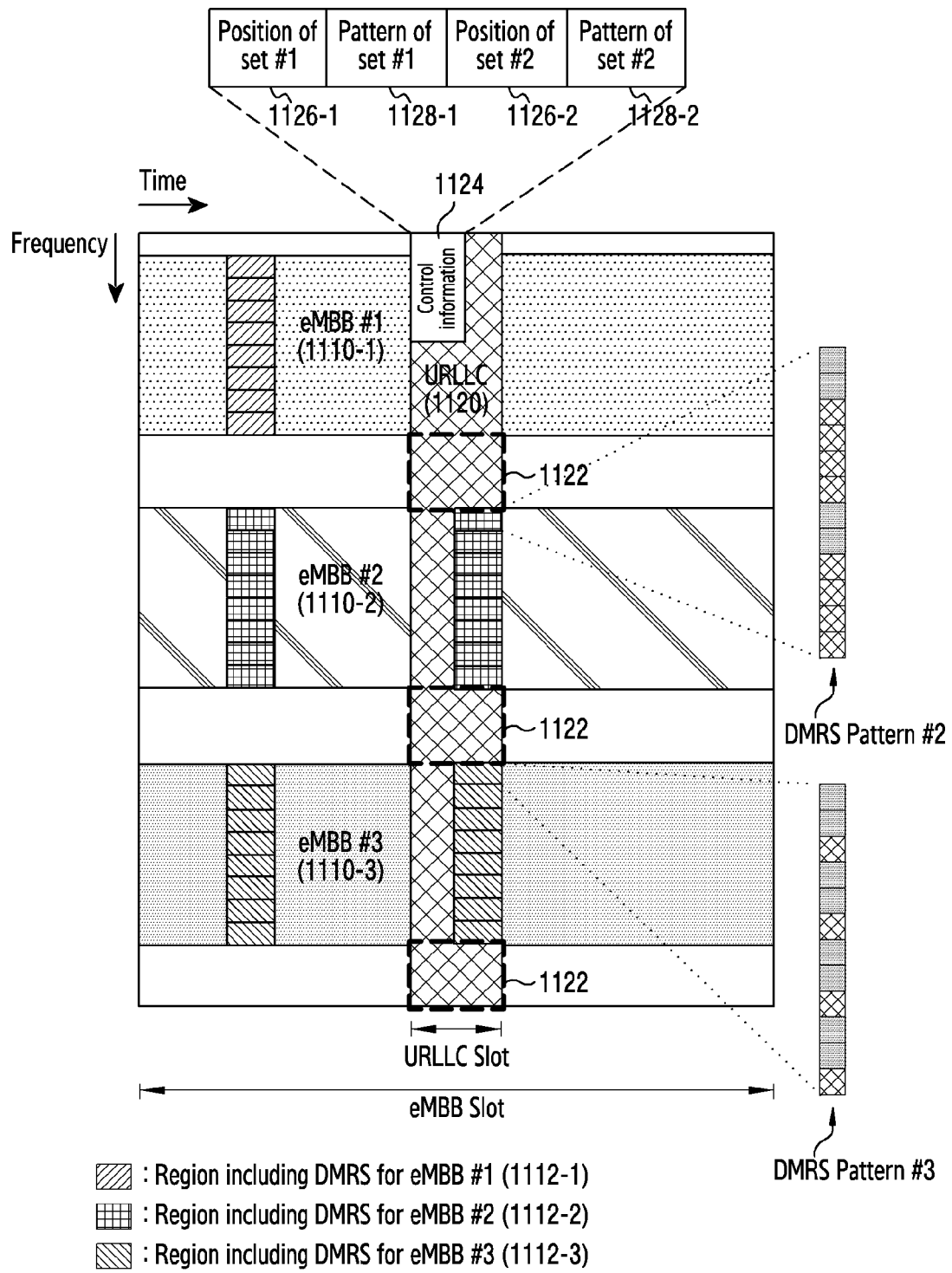
FIG. 11B illustrates an example of signal mapping in the case of notifying of a pattern of reference signals for each reference signal set in a wireless communication system according to various embodiments of the disclosure.

FIG. 11B illustrates an example of signal mapping in the case of notifying of a pattern of reference signals for each reference signal set in a wireless communication system according to various embodiments of the disclosure. Referring to FIG. 11B, resources are allocated to an eMBB #1 1110-1, an eMBB #2 1110-2, and an eMBB #3 1110-3 in an eMBB slot. DMRSs for the eMBB may not be punctured, and some of eMBB data signals may be punctured. Further, resources at positions where the eMBB data signals have been punctured are allocated to a URLLC 1120. However, some 1122 of URLLC resources may be allocated even without puncturing eMBB signals. A region, provided by puncturing eMBB signals among the resources allocated to the URLLC 1120, may be resource regions allocated to multiple eMBB terminals.

Since DMRS patterns in regions 1112-1, 1112-2, and 1112-3 including DMRSs can be allocated specifically to a terminal, patterns of DMRSs allocated to respective eMBB terminals may be different from each other. In FIG. 11B, a terminal receiving the eMBB #1 1110-1 is in a channel environment where a frequency-axis change is relatively small, and a terminal receiving the eMBB #2 1110-2 is in a channel environment where a frequency-axis channel is relatively large. Since a base station can know positions of DMRSs in a resource region allocated to each eMBB, the base station punctures an eMBB data signal without puncturing DMRSs, and then transmits a URLLC signal.

When a URLLC signal is transmitted as described above, eMBB DMRSs may exist in some resources in the slot of the URLLC 1120. Also, eMBB DMRS sets having different patterns may exist in some resources in the slot of the URLLC 1120. A URLLC terminal should receive a URLLC signal on the remaining resources except for an eMBB DMRS among the resources allocated to itself. Therefore, the base station should transmit, to the URLLC terminal, the position, at which an eMBB signal has been punctured in the slot of the URLLC 1120, and pattern information of eMBB DMRSs.

To this end, control information 1124 (e.g., Downlink Control Information (DCI)) includes information on positions and DMRS patterns of the regions 1112-1, 1112-2, and 1112-3 including eMBB DMRSs. In other words, the base station transmits the information on the positions and the DMRS patterns of the regions 1112-1, 1112-2, and 1112-3 for avoiding eMBB DMRSs, to the URLLC terminal through the control information 1124 of the URLLC 1120. In FIG. 11B, DMRSs for the eMBB #1 1110-1 do not exist in the slot of the URLLC 1120, and thus the control information 1124 includes information on DMRSs for the eMBB #2 1110-2 and DMRSs for the eMBB #3 1110-3. Specifically, as illustrated in FIG. 11B, the control information 1124 may include position information 1126-1 and pattern information 1128-1 of a DMRS set #1, and position information 1126-2 and pattern information 1128-2 of a DMRS set #2. In this example, the position information 1126-1 or 1126-2 may indicate a start position and the number of consecutive resources of resources (e.g., PRBs, subcarriers, or REs) to which relevant DMRSs are mapped, and the pattern information 1128-1 or 1128-2 may indicate a pattern (e.g., a pattern index) of DMRSs included in a relevant resource region. For example, when: a start position of resources is PRB #8; the number of PRBs to which DMRSs are mapped is 16; and a pattern index is 1, a position and pattern of the corresponding DMRS set may be expressed as "0001000 10000 001".

In the example of FIG. 11B, the control information 1124 does not include information on a symbol within which the regions 1112-2 and 1112-3 including DMRSs in the slot of the URLLC 1120 exist. Since a position of a symbol to which the regions 1112-2 and 1112-3 are mapped can be verified from predefined DMRS patterns, the URLLC terminal may identify a symbol, within which the regions 1112-2 and 1112-3 including the DMRSs in the slot of the URLLC 1120 exist, even without separate information. In this regard, according to another embodiment, the control information 1124 may further include information (e.g., a symbol index) on a symbol within which the regions 1112-2 and 1112-3 including the DMRSs in the slot of the URLLC 1120 exist.

As in the embodiments described with reference to FIG. 10 to FIG. 11B, a position and a pattern of reference signals may be signaled for each reference signal set. Since a control channel of URLLC requires a Block Error Rate (BLER) less than $10^{-5}$, when a second service is URLLC, it is necessary to reduce overhead of a control signal and apply powerful channel coding. Therefore, in the disclosure, an embodiment which, together with prevention of loss of a reference signal for a first service, enables relative reduction of overhead of control information of a second service will be described below.

According to an embodiment, resources allocated to a second service may be grouped, and an avoidance pattern of reference signals may be determined for each resource group. In this example, a base station may transmit, to a second service terminal, information on the avoidance pattern of the reference signals applied to each resource group of the second service. Through grouping, compared with the above-described embodiment, overhead of a control signal of the second service can be reduced. Hereinafter, embodiments for signaling a pattern for each resource group will be described with reference to FIG. 12 to FIG. 13B.

Figure 12:
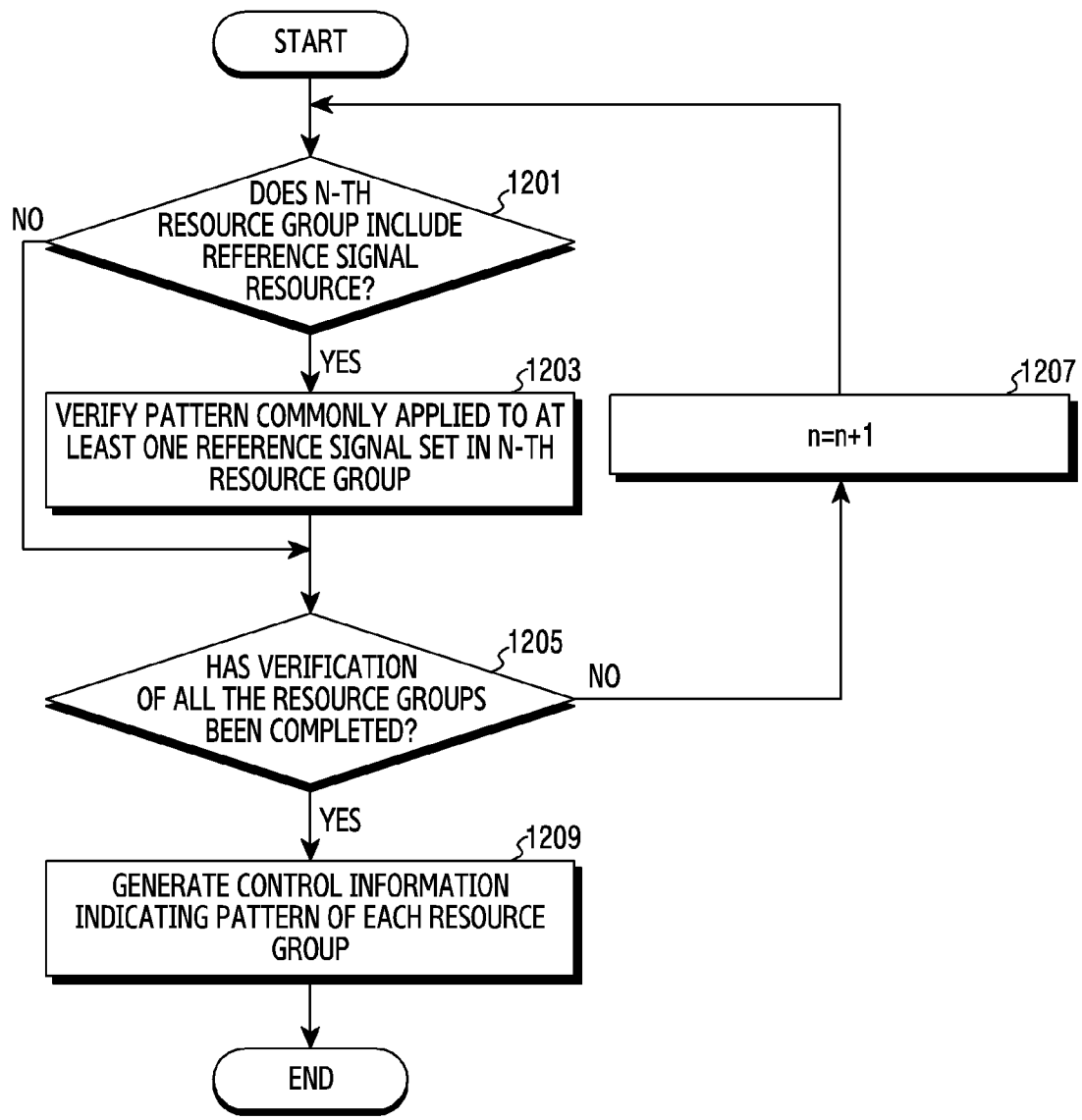
FIG. 12 illustrates an operating method of a base station for notifying of a pattern of reference signals for each resource group in a wireless communication system according to various embodiments of the disclosure.

FIG. 12 illustrates an operating method of a base station for notifying of a pattern of reference signals for each resource group in a wireless communication system according to various embodiments of the disclosure. FIG. 12 illustrates an example of an operating method of the base station 110.

Referring to FIG. 12, in operation 1201, the base station verifies whether an n-th resource group includes a reference signal. In this example, when this procedure is started, n is initialized to be 1. A slot of a second service is divided into multiple resource groups on the frequency axis, and the base station verifies whether each resource group includes a reference signal for a first service. When the n-th resource group does not include a reference signal for the first service, the base station omits operation 1203, and proceeds to operation 1205.

In contrast, when the n-th resource group includes a reference signal for the first service, in operation 1203, the base station verifies a pattern commonly applied to at least one reference signal set in the n-th resource group. When a boundary of resource groups does not coincide with a boundary of reference signal sets, one resource group may include at least two reference signal sets. In this example, reference signal sets may have different reference signal patterns. In this example, the base station may determine one pattern which can cover the different reference signal patterns.

In operation 1205, the base station determines whether verification of all the resource groups has been completed. When all the resource groups have not been verified, that is, when a resource group to be verified is left, in operation 1207, the base station increases n by 1, and returns to operation 1201.

In contrast, when all the resource groups have been verified, in operation 1209, the base station generates control information indicating a pattern of each resource group. For example, a pattern of each resource group may be expressed using a pattern index. In this example, the control information may include as many pattern-related information elements as the number of resource groups.

In the embodiment illustrated in FIG. 12, control information is generated after patterns of all the resource groups are verified. However, according to another embodiment, control information may be sequentially generated whenever a pattern of each resource group is verified. In this example, operation 1209 may be replaced by an operation of concatenating, by the base station, information elements each representing a pattern of a corresponding resource group.

Figure 13A:
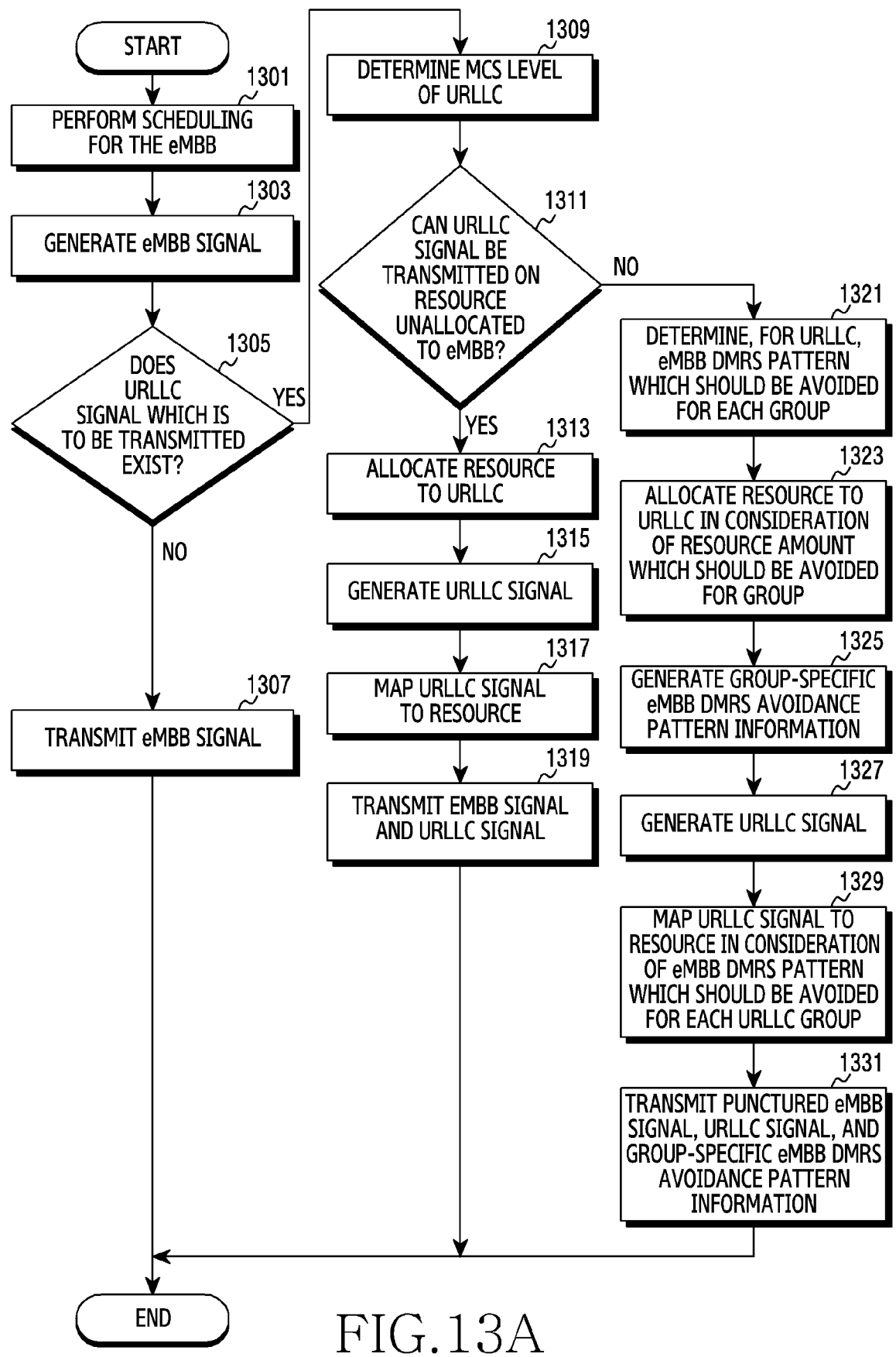
FIG. 13A illustrates a specific operating method of a base station for notifying of a pattern of reference signals for each resource group in a wireless communication system according to various embodiments of the disclosure.

FIG. 13A illustrates a specific operating method of a base station for notifying of a pattern of reference signals for each resource group in a wireless communication system according to various embodiments of the disclosure. FIG. 13A illustrates an operating method of the base station 110, and illustrates an example of a specific case in which a first service is eMBB and a second service is URLLC.

Referring to FIG. 13A, in operation 1301, the base station performs scheduling for the eMBB. Then, in operation 1303, the base station generates an eMBB signal. In other words, the base station may generate signals to be mapped to resources, by encoding and modulating eMBB data according to an MCS determined through the scheduling. Then, in operation 1305, the base station determines whether a URLLC signal which is to be transmitted exists. When the URLLC signal which is to be transmitted does not exist, in operation 1307, the base station transmits an eMBB signal. That is, the base station transmits an eMBB signal according to the scheduling performed in operation 1301.

In contrast, when the URLLC signal which is to be transmitted exists, in operation 1309, the base station determines an MCS level of the URLLC. Then, in operation 1311, the base station determines whether a URLLC signal can be transmitted on a resource unallocated to the eMBB. When a URLLC signal can be transmitted on a resource unallocated to the eMBB, in operation 1313, the base station allocates a resource to the URLLC. In operation 1315, the base station generates a URLLC signal. Then, in operation 1317, the base station maps the URLLC signal to a resource. In other words, the base station maps the signal, generated in operation 1315, to the resource allocated in operation 1313. Then, in operation 1319, the base station transmits the eMBB signal and the URLLC signal.

In contrast, when it is determined in operation 1311 that the URLLC signal cannot be transmitted on the resource unallocated to the eMBB, in operation 1321, the base station determines, for the URLLC, an eMBB DMRS pattern which should be avoided for each group. Then, in operation 1323, the base station allocates a resource to the URLLC so as to reflect a resource amount which should be avoided for group. In this example, the base station limits reallocated resources so that the base station reallocates some of eMBB resources to the URLLC but DMRS resources are not reallocated. Accordingly, in one symbol, some resources may be allocated to DMRSs for the eMBB, and some resources may be allocated to the URLLC. Then, in operation 1325, the base station generates group-specific eMBB DMRS avoidance pattern information. The DMRS avoidance pattern information may include resource group-specific pattern information. For example, the DMRS avoidance pattern information may include the information generated in operation 1009 of FIG. 12. Then, in operation 1327, the base station generates a URLLC signal. Then, in operation 1329, the base station maps the URLLC signal to a resource in consideration of the eMBB DMRS pattern which should be avoided for each group. Then, in operation 1331, the base station transmits the eMBB signal, the URLLC signal, and the group-specific DMRS avoidance pattern information. In this example, the group-specific DMRS avoidance pattern information may be a part of the URLLC signal.

As described with reference to FIG. 13A, some of eMBB signals may be punctured, and a URLLC signal may be transmitted at a position where the eMBB signal has been punctured. When the URLLC signal is transmitted through the procedure exemplified in FIG. 13A, signals may be mapped as illustrated in FIG. 13B.

Figure 13B:
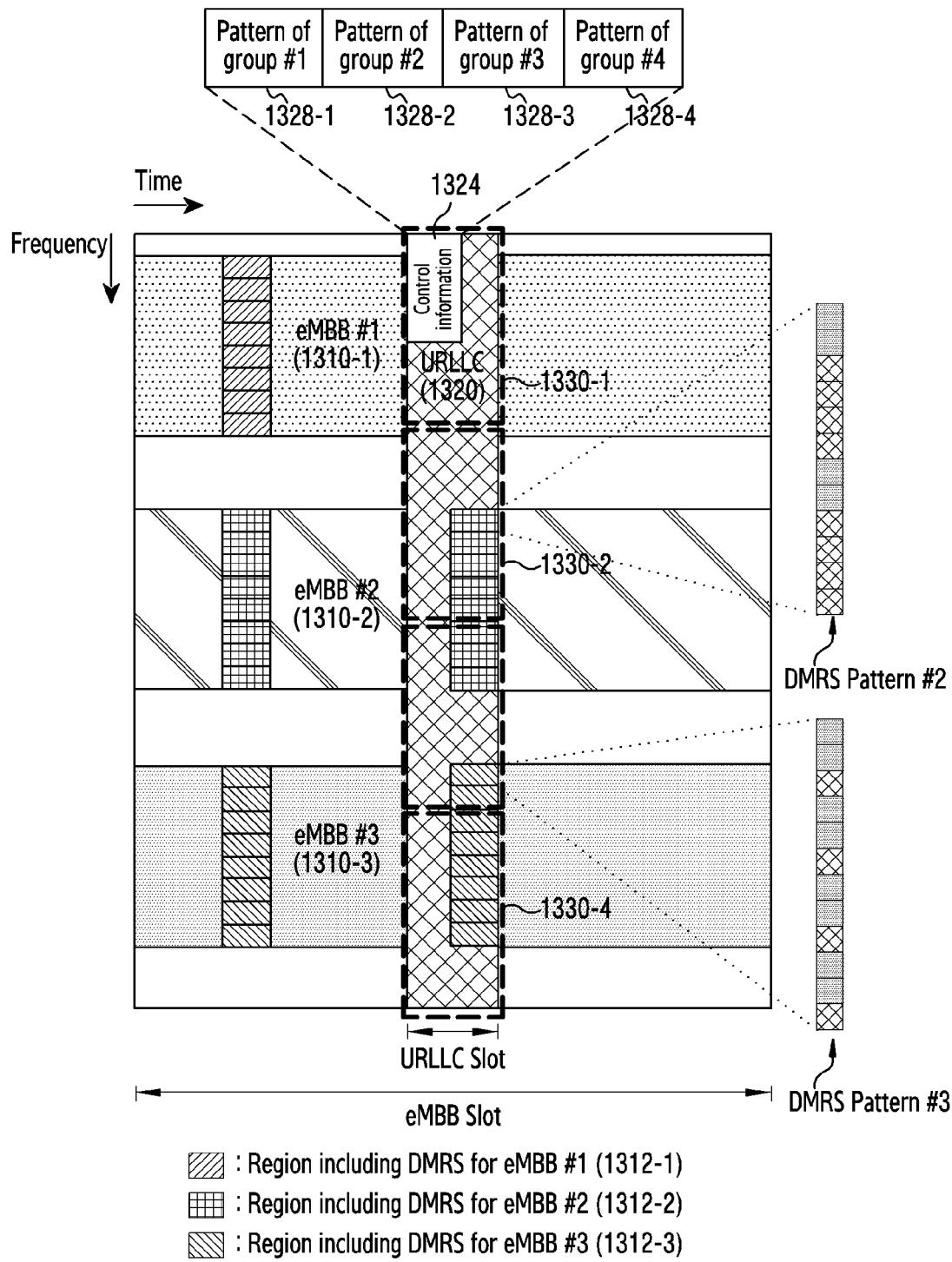
FIG. 13B illustrates an example of signal mapping in the case of notifying of a pattern of reference signals for each resource group in a wireless communication system according to various embodiments of the disclosure.

FIG. 13B illustrates an example of signal mapping in the case of notifying of a pattern of reference signals for each resource group in a wireless communication system according to various embodiments of the disclosure. Referring to FIG. 13B, resources are allocated to an eMBB #1 1310-1, an eMBB #2 1310-2, and an eMBB #3 1310-3 in an eMBB slot. DMRSs for the eMBB may not be punctured, and some of eMBB data signals may be punctured. Further, resources at positions where the eMBB data signals have been punctured are allocated to a URLLC 1320.

Resources in the slot of the URLLC 1320 may be grouped on the frequency axis. In the example of FIG. 13B, four resource groups 1330-1 to 1330-4 are configured. A puncturing pattern, which allows avoidance of eMBB DMRSs, is determined for each of the resource groups 1330-1 to 1330-4, and some of eMBB signals are punctured. In this example, a pattern is determined such that all the included DMRSs can be avoided in each of the resource groups 1330-1 to 1330-4. For example, a resource group #2 1330-2 includes some of regions 1330-2 including DMRSs for the eMBB #2, and some of regions 1330-3 including DMRSs for the eMBB #3. In this example, when positions of DMRSs according to a DMRS pattern #3 include positions of DMRSs according to a DMRS pattern #2, a DMRS avoidance pattern of the resource group #2 1330-2 may be determined as the DMRS pattern #3. When DMRS patterns are defined as illustrated in FIG. 13B, the DMRS pattern #3 includes the DMRS pattern #2. However, according to another embodiment, a DMRS avoidance pattern may be different from predefined DMRS patterns.

Since one pattern which covers multiple DMRS patterns is determined in the resource groups 1330-1 to 1330-4, there may exist a resource (hereinafter "non-DMRS avoidance resource") to which a DMRS is not mapped but which is avoided by the URLLC terminal. In this example, the base station may map or not map a URLLC signal to a non-DMRS avoidance resource. When the base station does not map a URLLC signal to a non-DMRS avoidance resource, the base station may perform rate matching of the URLLC signal in consideration of a puncturing pattern of an eMBB signal. At this time, according to an embodiment, the base station may render the non-DMRS avoidance resource empty. According to another embodiment, the base station may transmit an eMBB signal on a non-DMRS avoidance resource. In this example, information notifying of transmission of an eMBB signal may be additionally signaled. When a URLLC signal is mapped to a non-DMRS avoidance resource, according to an embodiment, the base station may transmit the URLLC signal on the remaining resource except for only an eMBB DMRS.

The base station may transmit eMBB DMRS avoidance information, applied to each resource group, to the URLLC terminal. Further, the base station may transmit a URLLC signal on the remaining resource except for a DMRS resource, according to a DMRS avoidance pattern of each resource group. Accordingly, the URLLC terminal may receive a signal by using an eMBB DMRS avoidance pattern provided for each resource group. In other words, the terminal may determine a resource (e.g., a RE), to which a URLLC signal is mapped, using resource group-specific DMRS avoidance information, and may then perform a reception algorithm on the URLLC signal. In the example of FIG. 13B, the control information 1324 of the URLLC includes, as eMBB DMRS avoidance information, pattern information 1328-1 of a resource group #1, pattern information 1328-2 of a resource group #2, pattern information 1328-3 of a resource group #3, and pattern information 1328-4 of a resource group #4. The number of bits of resource group-specific pattern information may be determined on the basis of the number of patterns which can be designated. When: four patterns can be designated; the slot of the URLLC 1320 includes four resource groups; and indices of patterns of the four resource groups are 1, 2, 3, and 3, the patterns of the four resource groups may be expressed as "01 10 11 11".

As in the embodiments described with reference to FIG. 12 to FIG. 13B, a pattern of reference signals may be signaled for each resource group. Therefore, the base station may notify, with small overhead, the URLLC terminal of positions of resources which should be avoided. Further, the base station adjusts a size of each resource group in a slot, and thus can effectively notify of a pattern by using information having a fixed size. In contrast, the base station may adjust a size of control information in relation to a fixed size of a resource group.

According to another embodiment, reference signals for a first service may be punctured. In this example, additional operation for improving channel estimation performance in the first service may be performed. For example, the base station may map a punctured reference signal to a resource at a position different from a position before being punctured. In this configuration, overhead of an additional control signal in a second service does not occur. Hereinafter, embodiments for puncturing reference signals and mapping the punctured reference signal to a resource at another position will be described with reference to FIG. 14A to FIG. 16C.

Figure 14A:
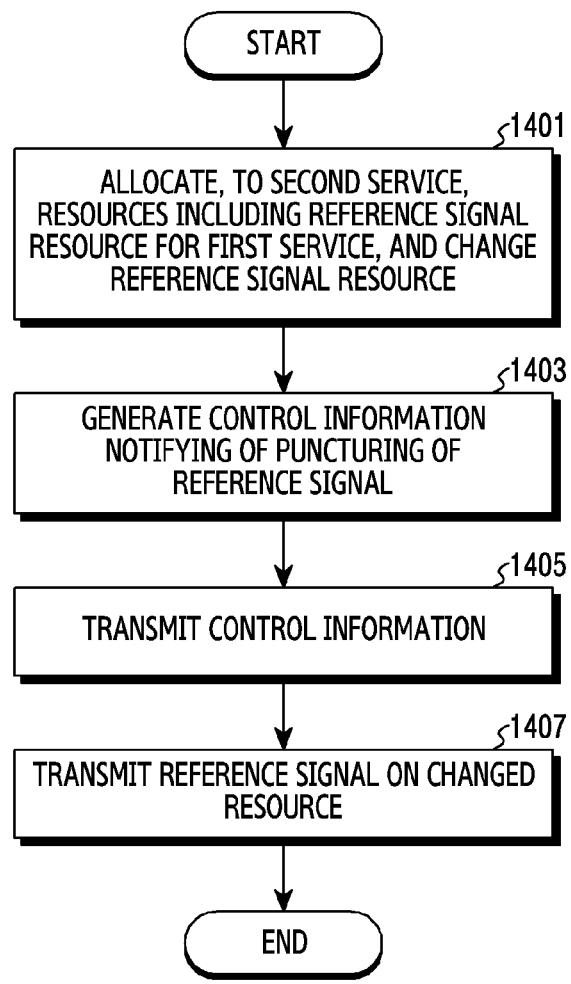
FIG. 14A illustrates an operating method of a base station for transmitting a reference signal on a changed resource in a wireless communication system according to various embodiments of the disclosure.

FIG. 14A illustrates an operating method of a base station for transmitting a reference signal on a changed resource in a wireless communication system according to various embodiments of the disclosure. FIG. 14A illustrates an operating method of the base station 110.

Referring to FIG. 14A, in operation 1401, the base station allocates, to a second service, resources including a reference signal resource for a first service, and changes a reference signal resource. In other words, the base station allocates, to the second service, a resource to which a reference signal is to be mapped, according to a pattern of the reference signal allocated to a first service terminal. That is, the base station punctures the reference signal. Then, the base station allocates, for the reference signal, another resource which is not included in a slot of the second service. For example, another resource may be included in a symbol right after a last symbol of the slot of the second service. Also, when the second service is not provided, another resource may be located in a subcarrier identical to a resource to which the punctured reference signal is mapped.

In operation 1403, the base station generates control information notifying of puncturing of a reference signal. For example, the control information notifying of puncturing of a reference signal may include at least one piece of information among: information on whether a reference signal can be punctured; information on whether a reference signal resource can be moved; information on whether the reference signal is punctured; and information on a changed reference signal resource.

In operation 1405, the base station transmits the control information. The control information may be transmitted on some of resources allocated to the first service. According to an embodiment, a part of the control information may be transmitted through first regions in a slot of the first service, and the remaining part may be transmitted through a second region different from the first regions. For example, the second region may include a resource different from a control channel of the first service. Further, a part of the control information may be broadcast, and the remaining part may be unicasted.

In operation 1407, the base station transmits a reference signal on a changed resource. According to an embodiment, the base station may transmit the punctured reference signals by using a symbol right after the last symbol of the slot of the second service. Further, when the second service is not provided, the base station may transmit the punctured reference signals by using a subcarrier identical to a resource to which the punctured reference signal is mapped.

Figure 14B:
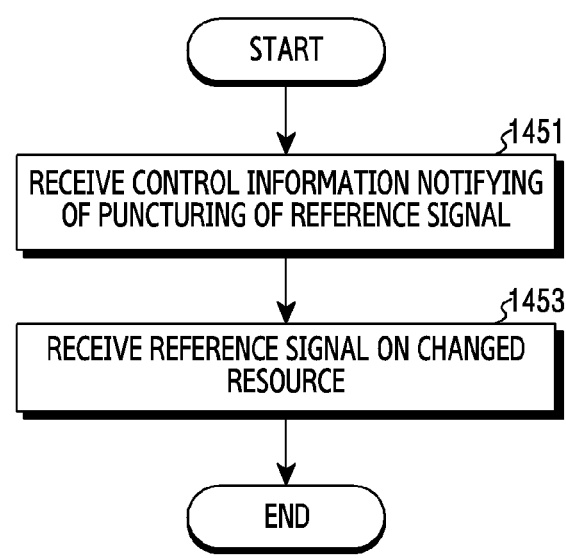
FIG. 14B illustrates an operating method of a base station for receiving a reference signal on a changed resource in a wireless communication system according to various embodiments of the disclosure.

FIG. 14B illustrates an operating method of a base station for receiving a reference signal on a changed resource in a wireless communication system according to various embodiments of the disclosure. FIG. 14B illustrates an operating method of the terminal 120 or the terminal 130, and illustrates an example of an operating method of a terminal which receives data of a first service.

Referring to FIG. 14B, in operation 1451, the terminal receives control information notifying of puncturing of a reference signal. For example, the control information notifying of puncturing of a reference signal may include at least one piece of information among: information on whether a reference signal can be punctured; information on whether a reference signal resource can be moved; information on whether the reference signal is punctured; and information on a changed reference signal resource.

In operation 1453, the terminal receives a reference signal on a changed resource. According to an embodiment, the terminal may receive the punctured reference signals by using a symbol right after a last symbol of a slot of the second service. Further, when the second service is not provided, the terminal may receive the punctured reference signals by using a subcarrier identical to a resource to which the punctured reference signal is mapped.

As in the embodiments described with reference to FIG. 14A and FIG. 14B, in order to transmit a second service signal, the base station may puncture an overlapping data signal and an overlapping reference signal of the first service, and may then transmit the second service signal. Since a reference signal is punctured, additional control information for the URLLC terminal is not required. In this example, in order to preserve channel estimation performance of the eMBB terminal, after a second service signal is transmitted, a reference signal, instead of a data signal, may be transmitted on some of resources allocated for a data signal of the first service. Before this situation, the base station may signal that a reference signal can be transmitted instead of a data signal. Before traffic of the second service is generated, the base station may signal that a reference signal can be transmitted instead of a data signal. This configuration causes the first service terminal to monitor information indicating whether a reference signal is punctured. An embodiment for signaling whether a reference signal can be transmitted instead of a data signal will be described below with reference to FIG. 15.

Figure 15:
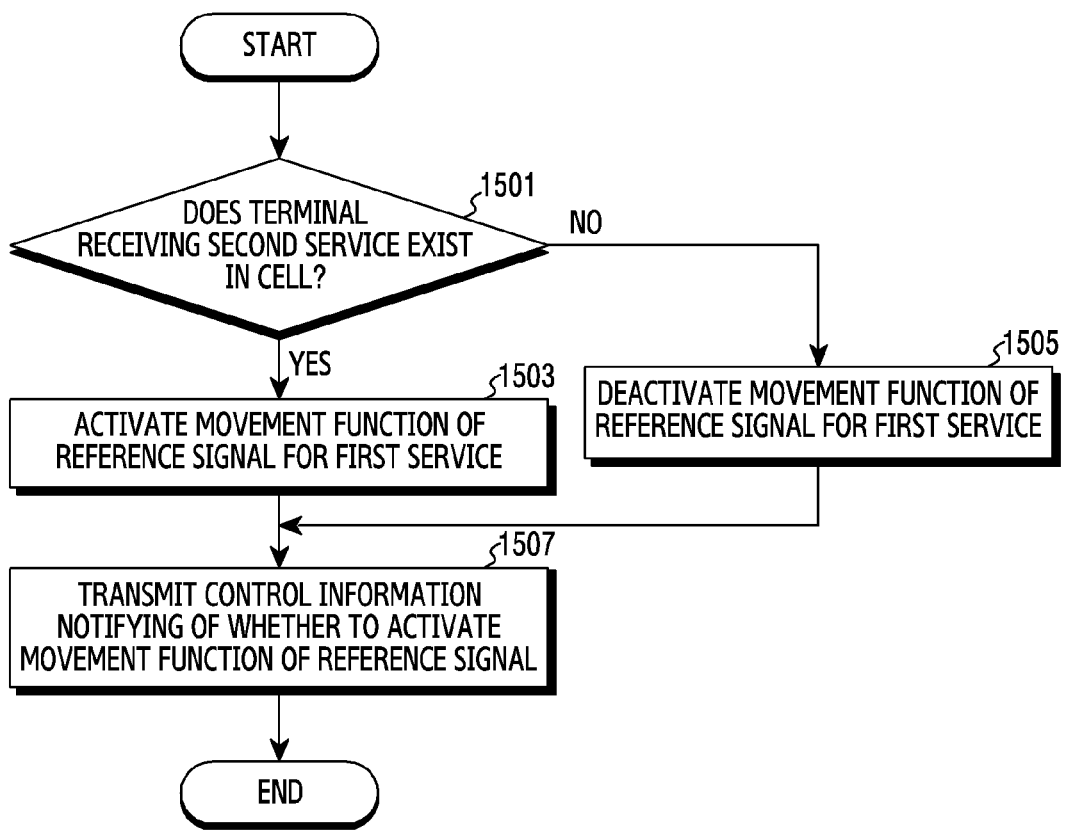
FIG. 15 illustrates an operating method of a base station for notifying of movability of a reference signal in a wireless communication system according to various embodiments of the disclosure.

FIG. 15 illustrates an operating method of a base station for notifying of movability of a reference signal in a wireless communication system according to various embodiments of the disclosure. FIG. 15 illustrates an example of an operating method of the base station 110.

Referring to FIG. 15, in operation 1501, the base station verifies whether a terminal receiving a second service exists in a cell. For example, the base station may determine whether a second service terminal exists, on the basis of at least one piece of information among: capability information of terminals being accessed; communication history information thereof; and context information thereof. In this example, the base station may determine whether a second service terminal exists except for a terminal operating in an idle mode.

When the second service terminal exists, in operation 1503, the base station activates a movement function of a reference signal for the first service. In contrast, when the second service terminal does not exist, in operation 1505, the base station deactivates the movement function of the reference signal for the first service. That is, when the second service terminal does not exist, there is no need for puncturing and the movement of the reference signal. Therefore, a function related to puncturing and movement of a reference signal may be selectively activated according to whether a second service terminal exists.

Then, in operation 1507, the base station transmits control information notifying of whether to activate a movement function of a reference signal. For example, control information may be transmitted or received through a control channel (e.g., PDCCH) of the first service. For example, control information may be unicast or broadcast.

Figure 16A:
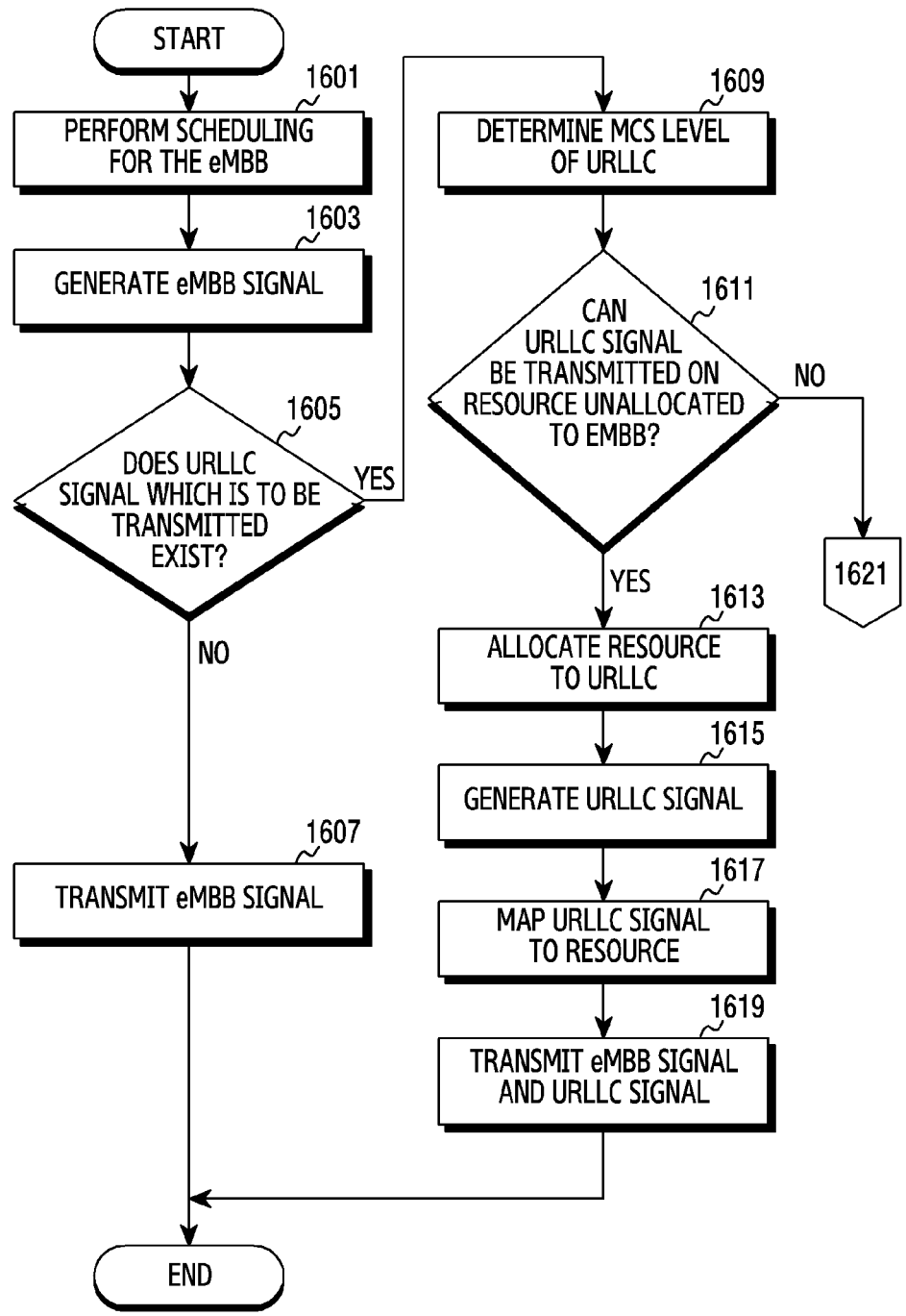
FIG. 16A and FIG. 16B illustrate a specific operating method of a base station for transmitting a reference signal on a changed resource in a wireless communication system according to various embodiments of the disclosure.
Figure 16B:
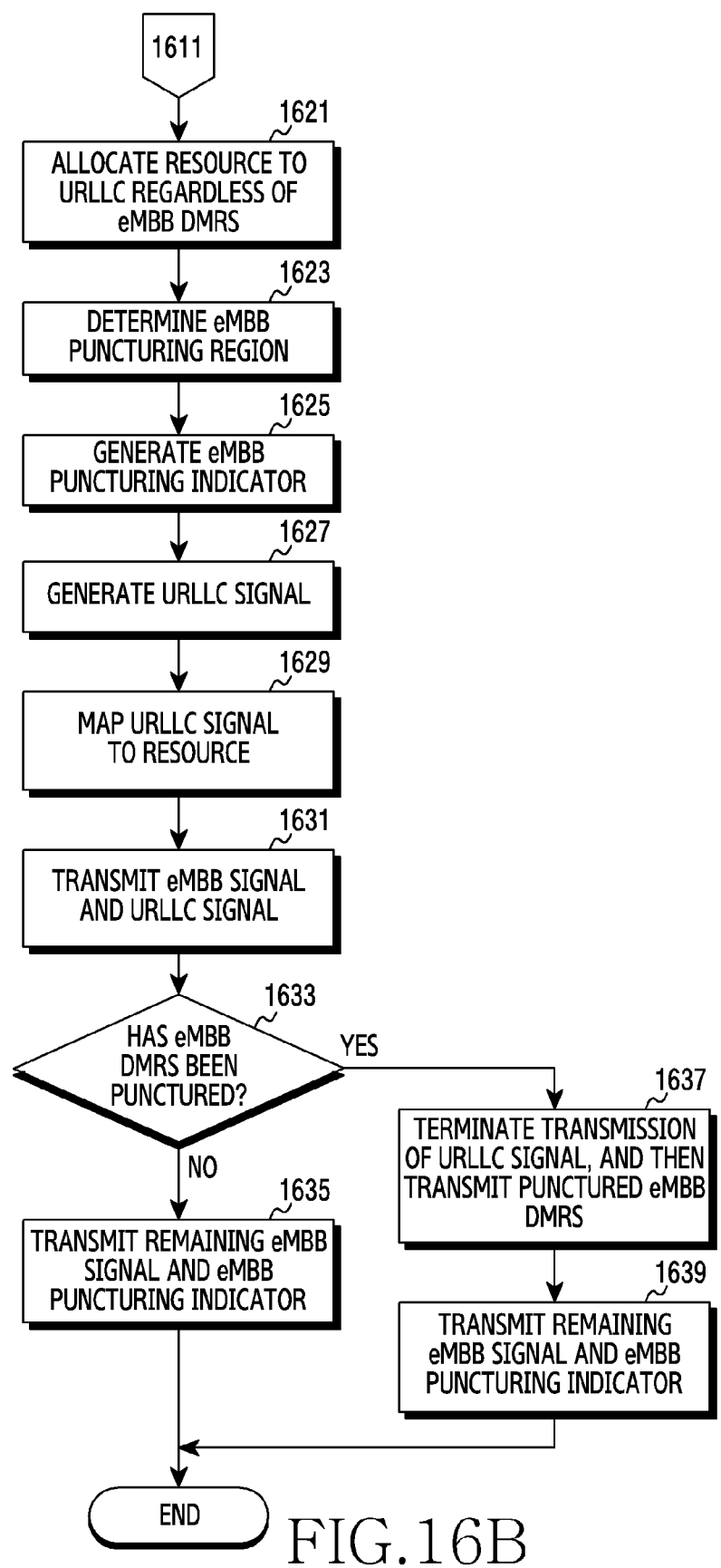

FIG. 16A and FIG. 16B illustrates a specific operating method of a base station for transmitting a reference signal on a changed resource in a wireless communication system according to various embodiments of the disclosure. FIG. 16A and FIG. 16B illustrates an operating method of the base station 110, and illustrates an example of a specific case in which a first service is eMBB and a second service is URLLC. FIG. 16A and FIG. 16B illustrate a situation in which it is assumed that a movement function of a reference signal is activated.

Referring to FIG. 16A and FIG. 16B, in operation 1601, the base station performs scheduling for the eMBB. Then, in operation 1603, the base station generates an eMBB signal. In other words, the base station may generate signals to be mapped to resources, by encoding and modulating eMBB data according to an MCS determined through the scheduling. Then, in operation 1605, the base station determines whether a URLLC signal which is to be transmitted exists.

When the URLLC signal which is to be transmitted does not exist, in operation 1607, the base station transmits an eMBB signal. That is, the base station transmits an eMBB signal according to the scheduling performed in operation 1601.

In contrast, when the URLLC signal which is to be transmitted exists, in operation 1609, the base station determines an MCS level of the URLLC. Then, in operation 1611, the base station determines whether a URLLC signal can be transmitted on a resource unallocated to the eMBB. When a URLLC signal can be transmitted on a resource unallocated to the eMBB, in operation 1613, the base station allocates a resource to the URLLC. In operation 1615, the base station generates a URLLC signal. Then, in operation 1617, the base station maps the URLLC signal to a resource. In other words, the base station maps the signal, generated in operation 1615, to the resource allocated in operation 1613. Then, in operation 1619, the base station transmits the eMBB signal and the URLLC signal.

In contrast, when it is determined in operation 1611 that the URLLC signal cannot be transmitted on the resource unallocated to the eMBB, in operation 1621, the base station allocates a resource to the URLLC regardless of an eMBB DMRS. That is, the base station reallocates some of eMBB resources to the URLLC, and the resources reallocated to the URLLC may include DMRS resource. Then, in operation 1623, the base station determines an eMBB puncturing region. For example, the base station may determine the resources, allocated to the URLLC, as an eMBB puncturing region. Then, in operation 1625, the base station generates an eMBB puncturing indicator. In this example, the eMBB puncturing indicator may be set to another value according to whether a DMRS is punctured. The eMBB puncturing indicator indicates positive or negative, and thus may be an energy signal for on/off detection, or may be a value expressed by at least one bit. Then, in operation 1627, the base station generates a URLLC signal. Next, in operation 1629, the base station maps the URLLC signal to a resource. In operation 1631, the base station transmits the eMBB signal and the URLLC signal.

In operation 1633, the base station verifies whether an eMBB DMRS has been punctured. When the eMBB DMRS has not been punctured, in operation 1635, the base station transmits the remaining eMBB signal and the eMBB puncturing indicator. According to another embodiment, an eMBB puncturing indicator may be transmitted before transmission of a URLLC signal. In contrast, when the eMBB DMRS has been punctured in order to allocate a resource to the URLLC, in operation 1637, the base station terminates transmission of the URLLC signal, and then transmits the punctured eMBB DMRS. Accordingly, a data signal, scheduled to be mapped to the resource for transmission of the punctured eMBB DMRS, is punctured. Then, in operation 1639, the base station transmits the remaining eMBB signal and an eMBB puncturing indicator.

According to another embodiment, an eMBB puncturing indicator may be transmitted before transmission of a URLLC signal.

As described with reference to FIG. 16A and FIG. 16B, some of eMBB signals including an eMBB DMRS may be punctured, and a URLLC signal may be transmitted at a position where the eMBB signal has been punctured. When a URLLC signal is transmitted through the procedure exemplified in FIG. 16A and FIG. 16B, signals may be mapped as illustrated in FIG. 16C.

Figure 16C:
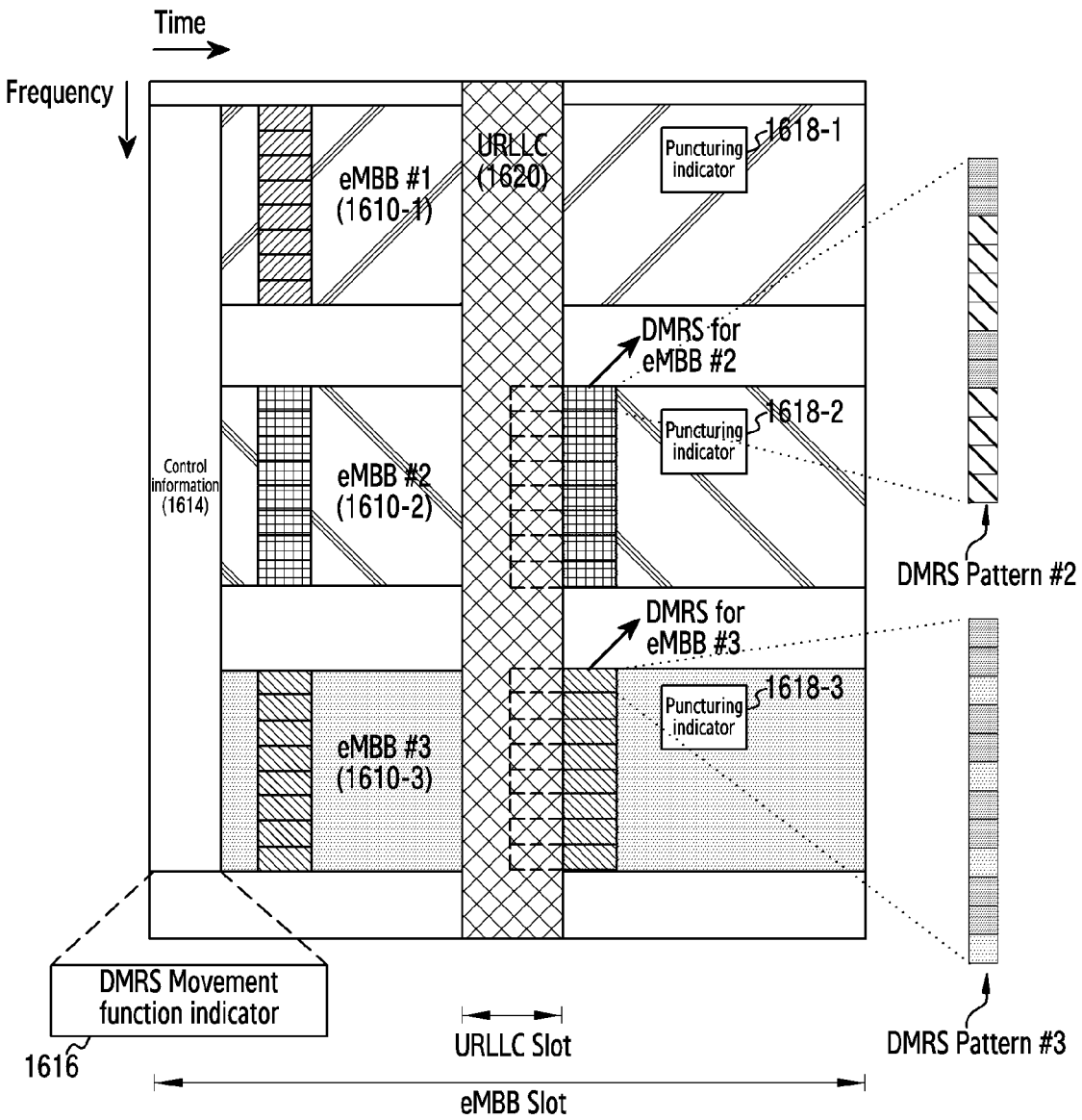
FIG. 16C illustrates an example of signal mapping in the case of transmitting a reference signal on a changed resource in a wireless communication system according to various embodiments of the disclosure.

FIG. 16C illustrates an example of signal mapping in the case of transmitting a reference signal on a changed resource in a wireless communication system according to various embodiments of the disclosure. Referring to FIG. 16C, resources are allocated to an eMBB #1 1610-1, an eMBB #2 1610-2, and an eMBB #3 1610-3 in an eMBB slot. Some of eMBB signals may be punctured for a URLLC 1620. Further, a resource at a position, at which an eMBB signal has been punctured, is allocated to the URLLC 1620.

In order to allocate a resource to the URLLC 1620, DMRSs may be punctured. In FIG. 16C, some of DMRSs for the eMBB #2 1610-2 and the eMBB #3 1610-3 are punctured. Accordingly, in order to notify of whether a reference signal can be punctured and moved, control information 1614 of the eMBB includes a DMRS movement function indicator 1616. Since a value of the DMRS movement function indicator 1616 is set before generation of traffic of the URLLC 1620, the DMRS movement function indicator 1616 indicates a possibility that a DMRS will be moved, and does not definitely indicate whether a DMRS is punctured.

Whether a DMRS is punctured may be definitely indicated by puncturing indicators 1618-1, 1618-2, and 1618-3. In other words, an eMBB DMRS is punctured, and transmission of a URLLC signal in a region 1640 including an original DMRS of the punctured DMRS may be signaled to each terminal by puncturing indicators 1618-1, 1618-2, and 1618-3. The eMBB terminals may verify the puncturing indicators 1618-1, 1618-2, and 1618-3, and after transmission of the URLLC signal is terminated, may recognize that an eMBB DMRS is transmitted on a resource at a position where an eMBB data signal is to be transmitted. Accordingly, the eMBB terminals may estimate a channel by using a DMRS transmitted in a region 1650 including a changed DMRS. When a URLLC signal is transmitted over consecutive symbols, the number of which is greater than or equal to a predetermined value, movement of a reference signal may not be performed.

In FIG. 16C, positions of the puncturing indicators 1618-1, 1618-2, and 1618-3 are an example. According to various embodiments, at least one of the puncturing indicators 1618-1, 1618-2, and 1618-3 may be transmitted in a state of being located at another position.

As in the examples described with reference to FIG. 14A to FIG. 16C, in order to ensure a resource to be allocated to the second service, even a reference signal as well as a data signal of the first service may be punctured. Accordingly, it is unnecessary to increase overhead of control information for notifying of a position of a reference signal. Further, a reference signal is transmitted on another resource, and thus serious degradation of channel estimation performance can be prevented.

According to another embodiment, reference signals for the first service may be punctured without mapping to another resource. In this configuration, additional overhead of control information in the second service does not occur, and degradation of channel estimation performance can be compensated through retransmission. Since a reference signal is punctured, the first service terminal regards a signal of the second service as a reference signal, and thus can use the signal of the second service to estimate a channel. Therefore, the base station can transmit information, which indicates puncturing of a reference signal, to the first service terminal. Hereinafter, embodiments for puncturing reference signals without changing a reference signal resource will be described with reference to FIG. 17A to FIG. 17C.

Figure 17A:
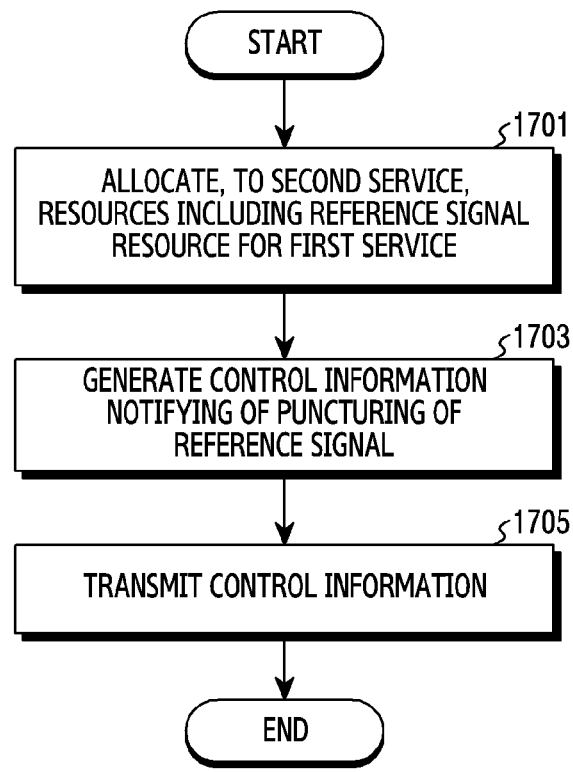
FIG. 17A illustrates an operating method of a base station for notifying of puncturing of a reference signal in a wireless communication system according to various embodiments of the disclosure.

FIG. 17A illustrates an operating method of a base station for notifying of puncturing of a reference signal in a wireless communication system according to various embodiments of the disclosure. FIG. 17A illustrates an example of an operating method of the base station 110.

Referring to FIG. 17A, in operation 1701, the base station allocates, to a second service, resources including a reference signal resource for a first service. In other words, the base station allocates a resource, to which a reference signal is to be mapped, to the second service according to a pattern of a reference signal allocated to a first service terminal. That is, the base station punctures a reference signal.

In operation 1703, the base station generates control information notifying of puncturing of a reference signal. For example, the control information notifying of puncturing of a reference signal may include at least one piece of information among: information on whether a reference signal can be punctured; and information on whether the reference signal is punctured.

In operation 1705, the base station transmits the control information. The control information may be transmitted on some of resources allocated to the first service. According to an embodiment, a part of the control information may be transmitted through first regions in a slot of the first service, and the remaining part may be transmitted through a second region different from the first regions. For example, the second region may include a resource different from a control channel of the first service. Further, a part of the control information may be broadcast, and the remaining part may be unicasted. Thereafter, although not illustrated in FIG. 17A, the base station may transmit a signal of the first service and a signal of the second service.

Figure 17B:
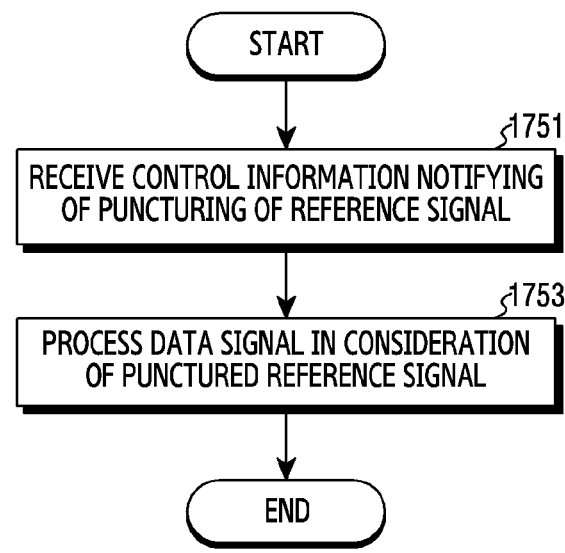
FIG. 17B illustrates an operating method of a terminal for processing a signal in consideration of puncturing of a reference signal in a wireless communication system according to various embodiments of the disclosure.

FIG. 17B illustrates an operating method of a terminal for processing a signal in consideration of puncturing of a reference signal in a wireless communication system according to various embodiments of the disclosure. FIG. 17B illustrates an operating method of the terminal 120 or the terminal 130, and illustrates an example of an operating method of the terminal which receives data of a first service.

Referring to FIG. 17B, in operation 1751, the terminal receives control information notifying of puncturing of a reference signal. For example, the control information notifying of puncturing of a reference signal may include at least one piece of information among: information on whether a reference signal can be punctured; and information on whether the reference signal is punctured.

In operation 1753, the terminal processes a data signal in consideration of the punctured reference signal. The terminal may recognize that at least one reference signal is punctured in a slot of the second service, on the basis of the control information. Accordingly, during channel estimation, the terminal may not use a signal received on a resource at the position of the punctured reference signal. In other words, the terminal estimates a channel by using reference signals, the number of which is fewer than in a case where a resource is not allocated to the second service.

As described with reference to FIG. 17A and FIG. 17B, a signal of the second service may be transmitted at a position where a reference signal for the first service has been punctured. When a reference signal is punctured through the procedure exemplified in FIG. 17A and FIG. 17B, signals may be mapped as illustrated in FIG. 17C.

Figure 17C:
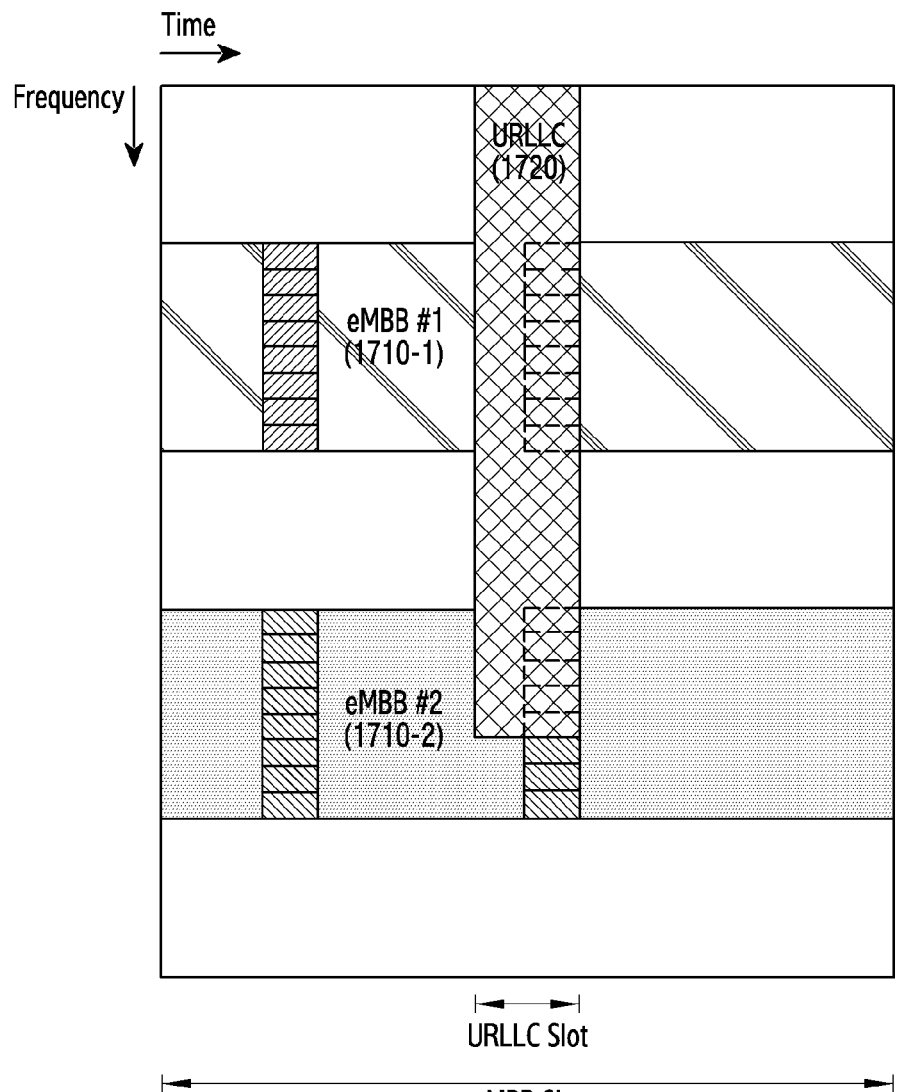
FIG. 17C illustrates an example of signal mapping in the case of puncturing of a reference signal in a wireless communication system according to various embodiments of the disclosure.

FIG. 17C illustrates an example of signal mapping in the case of puncturing of a reference signal in a wireless communication system according to various embodiments of the disclosure. Referring to FIG. 17C, resources are allocated to an eMBB #1 1710-1 and an eMBB #2 1710-2 in an eMBB slot. Some of eMBB signals may be punctured for a URLLC 1720. Then, a resource at a position, at which an eMBB signal has been punctured, is allocated to the URLLC 7620. In this example, the punctured eMBB signals include a data signal and a DMRS. That is, a DMRS in a region 1740 is punctured, and a resource, scheduled to be used for transmission the DMRS in the region 1740, is allocated to the URLLC 7620.

As in the embodiments described with reference to FIG. 17A to FIG. 17C, a reference signal may be punctured. Accordingly, it is unnecessary to increase overhead of control information notifying of a position of a reference signal.

According to another embodiment, in order to prevent allocation of resources to the second service from affecting a reference signal, the base station may allocate a resource to the second service in the remaining region except for a symbol to which a reference signal is mapped. That is, the base station may transmit a signal of the second service, except for OFDM symbols including a reference signal resource. In this example, overhead due to additional control information may not occur in both the first service and the second service. Hereinafter, an embodiment for allocating a resource to a second service in the remaining region except for a symbol to which a reference signal is mapped will be described with reference to FIG. 18A and FIG. 18B.

Figure 18A:
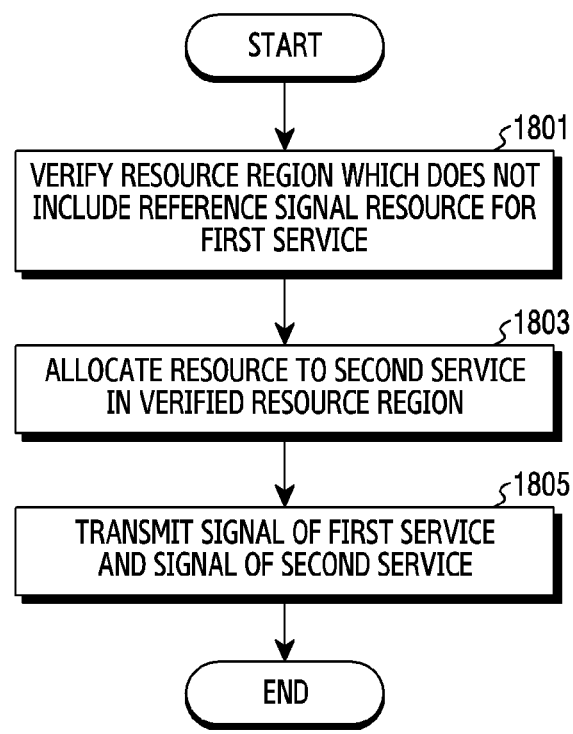
FIG. 18A illustrates an operating method of a base station for allocating a resource to a second service so as to avoid a symbol, to which a reference signal is mapped, in a wireless communication system according to various embodiments of the disclosure.

FIG. 18A illustrates an operating method of a base station for allocating a resource to a second service so as to avoid a symbol, to which a reference signal is mapped, in a wireless communication system according to various embodiments of the disclosure. FIG. 18A illustrates an example of an operating method of the base station 110.

Referring to FIG. 18A, in operation 1801, the base station verifies a resource region which does not include a reference signal resource for a first service. In other words, the base station verifies at least one slot which does not include a reference signal resource among multiple slots of the second service which can be selected. That is, the base station may verify symbols which do not include a reference signal resource.

In operation 1803, the base station allocates a resource to the second service in the verified resource region. Accordingly, signals of the first service, which are scheduled to be transmitted on a resource allocated to the second service, may be punctured. However, since a resource is allocated in a resource region which does not include a reference signal resource, a reference signal for the first service is not punctured.

In operation 1805, the base station transmits a signal of the first service and a signal of the second service. In this example, reference signals allocated to the first service terminal may all be transmitted without damage.

As described with reference to FIG. 18A, a resource may be allocated to the second service without damaging a reference signal. Signals may be mapped as illustrated in FIG. 18B when a resource is allocated through the procedure exemplified in FIG. 18A.

Figure 18B:
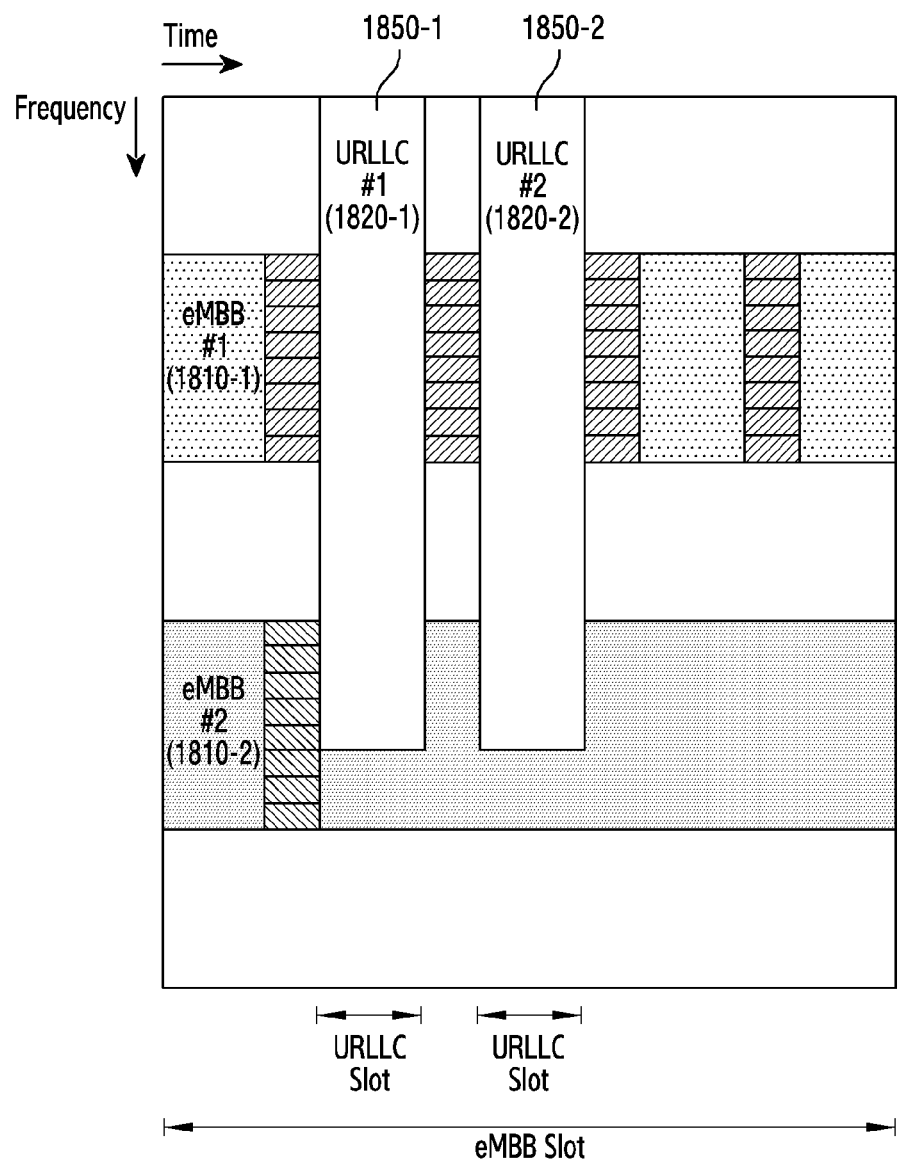
FIG. 18B illustrates an example of signal mapping in the case of allocating a resource to a second service so as to avoid a symbol, to which a reference signal is mapped, in a wireless communication system according to various embodiments of the disclosure.

FIG. 18B illustrates an example of signal mapping in the case of allocating a resource to a second service so as to avoid a symbol, to which a reference signal is mapped, in a wireless communication system according to various embodiments of the disclosure. Referring to FIG. 18B, resources are allocated to an eMBB #1 1810-1 and an eMBB #2 1810-2 in an eMBB slot. Some of eMBB signals may be punctured for a URLLC #1 1820-1 and a URLLC #2 1820-2. However, in FIG. 18B, DMRSs are not punctured. Further, Resources 1850-1 and 1850-2 at positions, at which eMBB signals have been punctured, are allocated to the URLLC #1 1820-1 and the URLLC #2 1820-2, respectively.

When the resource allocation scheme as illustrated in FIG. 18B is applied to the second service, the base station may: calculate a resource amount to be allocated to the second service; and allocate a resource to the second service only when a reference signal of the first service does not exist in a resource region satisfying the calculated resource amount. When a reference signal of the first service exists in the relevant region, the base station adjusts a time or frequency domain, and repeatedly verifies whether a reference signal of the first service exists in the relevant region. The base station may repeatedly perform adjustment and verification so as to find a region in which a reference signal of the first service does not exist, and may then allocate a resource to the second service. Accordingly, a time point at which a resource can be allocated to the second service may be limited, and thus a delay time of the second service may be increased. However, this scheme does not damage a reference signal of the first service, and does not increase overhead of a control signal for the second service.

Methods according to claims of the disclosure or embodiments described in the specification thereof may be implemented in hardware, software, or as a combination of hardware and software.

When the methods are implemented in software, a computer-readable storage medium configured to store one or more programs (software modules) may be provided. The one or more programs stored in the computer-readable storage medium may be configured to be executable by one or more processors within an electronic device. The one or more programs may include instructions that cause the electronic device to perform the methods according to claims of the disclosure or embodiments described in the specification thereof.

The programs (software modules or software) may be stored in non-volatile memories including a random access memory and a flash memory, a Read Only Memory (ROM), an Electrically Erasable Programmable Read Only Memory (EEPROM), a magnetic disc storage device, a Compact Disc-ROM (CD-ROM), a Digital Versatile Disc (DVD), other type optical storage devices, or a magnetic cassette. Alternatively, the programs may be stored in a memory implemented by a combination of some or all of the above-described memories. Further, the electronic device may include a plurality of such memories.

Also, the programs may be stored in an attachable storage device which may access the electronic device through a communication network, such as the Internet, the Intranet, a Local Area Network (LAN), a Wide LAN (WLAN), or a Storage Area Network (SAN), or through a communication network implemented by a combination thereof. Such a storage device may access an apparatus configured to perform embodiments of the disclosure via an external port. Further, a separate storage device on the communication network may access an apparatus configured to perform embodiments of the disclosure.

In the above-described specific embodiments of the disclosure, an element included in the disclosure is expressed in a singular or plural form according to a presented specific embodiment. However, the singular or plural expression is appropriately selected according to the presented situation for convenience of description, and the disclosure is not limited to a single element or multiple elements thereof. An element expressed in the plural form may be configured as a single element, or an element expressed in the singular form may be configured as multiple elements.

While specific embodiments have been described in the detailed description of the disclosure, it goes without saying that various changes can be made within a limit without departing from the scope of the disclosure. Therefore, the scope of the disclosure should not be limited to and defined by the above-described embodiments, and should be defined not only by the appended claims but also by the equivalents to the scope of the claims.

The invention claimed is:

1. A method for operating a base station in a wireless communication system, the method comprising:
reallocating a first resource, allocated to a first service, to a second service by puncturing at least one reference signal included in the first resource;
transmitting control information related to the punctured at least one reference signal; and
transmitting the punctured at least one reference signal on a second resource different from the first resource,
wherein a symbol in the second resource is immediately adjacent to a last symbol in the first resource in a time domain.

2. The method of claim 1, wherein, when the second service is not provided, the second resource is located in the same subcarrier as a resource to which the punctured at least one reference signal is mapped.

3. The method of claim 1, wherein the control information comprises at least one piece of information among:
information on whether a reference signal for the first service can be punctured;
information on whether a resource to which the reference signal is mapped can be moved;
information on whether the reference signal is punctured; and
information on the second resource.

4. The method of claim 1, wherein at least a part of the control information is transmitted by at least one terminal receiving the first service through a control channel of the first service.

5. The method of claim 1, wherein the first service comprises a enhanced mobile broad band (eMBB), and
wherein the second service comprises a ultra-reliable and low latency communication (URLLC) service.

6. The method of claim 1, wherein the control information includes position information and pattern information of the at least one reference signal per reference signal set.

7. The method of claim 1, wherein the control information includes pattern information of the at least one reference signal per resource group.

8. A method for operating a terminal in a wireless communication system, the method comprising:
receiving control information related to at least one reference signal included in a first resource allocated to a first service, wherein the at least one reference signal is punctured for reallocation of the first resource, to a second service; and
receiving the punctured at least one reference signal on a second resource different from the first resource,
wherein a symbol in the second resource is immediately adjacent to a last symbol in the first resource in a time domain.

9. The method of claim 8, wherein, when the second service is not provided, the second resource is located in the same subcarrier as a resource to which the punctured at least one reference signal is mapped.

10. The method of claim 8, wherein the control information comprises at least one piece of information among:
information on whether a reference signal for the first service can be punctured;

information on whether a resource to which the reference signal is mapped can be moved;

information on whether the reference signal is punctured; and information on the second resource.

11. The method of claim 8, wherein at least a part of the control information is transmitted by at least one terminal receiving the first service through a control channel of the first service.

12. The method of claim 8, wherein the control information includes position information and pattern information of the at least one reference signal per reference signal set.

13. The method of claim 8, wherein the control information includes pattern information of the at least one reference signal per resource group.

14. A terminal in a wireless communication system, the terminal comprising:

a transceiver; and at least one processor coupled to the transceiver and configured to:

receive control information related to at least one reference signal included in a first resource allocated to a first service, wherein the at least one reference signal is punctured for reallocation of the resource, to a second service, and receive the punctured at least one reference signal on a second resource different from the first resource, wherein a symbol in the second resource is immediately adjacent to a last symbol in the first resource in a time domain.

15. The terminal of claim 14, wherein, when the second service is not provided, the second resource is located in the same subcarrier as a resource to which the punctured at least one reference signal is mapped.

16. The terminal of claim 14, wherein the control information comprises at least one piece of information among:

information on whether a reference signal for the first service can be punctured;

information on whether a resource to which the reference signal is mapped can be moved;

information on whether the reference signal is punctured; and information on the second resource.

17. The terminal of claim 14, wherein at least a part of the control information is transmitted by at least one terminal receiving the first service through a control channel of the first service.

* * * * *